(12) United States Patent
Chen et al.

(10) Patent No.: US 12,028,904 B2
(45) Date of Patent: Jul. 2, 2024

(54) DATA TRANSMISSION METHOD AND APPARATUS

(71) Applicant: Huawei Technologies Co., Ltd., Shenzhen (CN)

(72) Inventors: Lei Chen, Beijing (CN); Hong Wang, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 17/486,186

(22) Filed: Sep. 27, 2021

(65) Prior Publication Data

US 2022/0015152 A1 Jan. 13, 2022

Related U.S. Application Data

(63) Continuation of application No. PCT/CN2019/080265, filed on Mar. 28, 2019.

(51) Int. Cl.
*H04W 74/0833* (2024.01)
*H04W 68/00* (2009.01)
*H04W 72/04* (2023.01)

(52) U.S. Cl.
CPC ..... *H04W 74/0833* (2013.01); *H04W 68/005* (2013.01); *H04W 72/04* (2013.01)

(58) Field of Classification Search
CPC ........... H04W 74/0833; H04W 68/005; H04W 72/04; H04W 74/006; H04W 76/11
See application file for complete search history.

(56) References Cited

U.S. PATENT DOCUMENTS

| 11,109,414 | B2 | 8/2021 | Liu et al. | |
|---|---|---|---|---|
| 2015/0326995 | A1* | 11/2015 | Li | H04W 72/51 370/329 |
| 2022/0110139 | A1* | 4/2022 | Pham Van | H04W 72/1273 |

FOREIGN PATENT DOCUMENTS

| CN | 101873707 A | * | 10/2010 |
|---|---|---|---|
| CN | 101873707 A | | 10/2010 |
| CN | 108307335 A | | 7/2018 |

(Continued)

OTHER PUBLICATIONS

"Options Comparison for MT EDT," Source: ZTE, Agenda Item: 12.1.2, Document for: Discussion and Decision, 3GPP TSG-RAN2 Meeting #104, R2-1816884, XP051480824, Spokane, United, Nov. 12-16, 2018, 10 pages.

(Continued)

*Primary Examiner* — Khoa Huynh
(74) *Attorney, Agent, or Firm* — SLATER MATSIL, LLP.

(57) ABSTRACT

A data transmission method and an apparatus, the method including sending, by an access network device, a paging message to a terminal device, where the paging message includes a first indication, receiving, by the access network device, a random access preamble from the terminal device, where the random access preamble corresponds to the first indication, and sending, by the access network device in response to the random access preamble, a response message to the terminal device, where the response message includes downlink data and one or more of a timing advance (TA), an uplink grant (UL-Grant), a temporary cell radio network temporary identity (TC-RNTI), a logical channel identifier (LCID), or a downlink assignment (DL-assignment).

20 Claims, 20 Drawing Sheets

(56) References Cited

FOREIGN PATENT DOCUMENTS

CN        108617004  A     10/2018
CN        108738139  A     11/2018

OTHER PUBLICATIONS

"3rd Generation Partnership Project; Technical Specification Group Radio Access Network; NR; Medium Access Control (MAC) Protocol Specification (Release 15)," 3GPP TS 38.321 V15.4.0, Dec. 2018, 77 pages.
"Early DL Data Transmission," Agenda Item: 12.1.2, Source: Huawei, HiSilicon, Document for: Discussion and Decision, 3GPP TSG-RAN WG2 Meeting #103bis, R2-1813914, XP051523384, Chengdu, China, Oct. 8-12, 2018, 8 pages.
"MT-Initiated EDT," Agenda Item: 12.1.2, 12.2.2, Source: Qualcomm Incorporated, Document for: Discussion/Decision, 3GPP TSG-RAN WG2 Meeting #103bis, R2-1814037, XP051523498, Chengdu, China, Oct. 8-12, 2018, 6 pages.
"General Considerations in MT EDT," Agenda Item: 12.1.2, Source: Ericsson, Document for: Discussion/Decision, 3GPP TSG-RAN WG2 #104, R2-1816635, XP051556205, Spokane, USA, Nov. 12-16, 2018, 5 pages.

* cited by examiner

| R | F | LCID |
|---|---|---|
| R | TA | |
| TA | | Uplink grant |
| Uplink grant | | |
| Uplink grant | | |
| TC-RNTI | | |
| TC-RNTI | | |
| L | | |
| Data | | |

FIG. 10

DATA TRANSMISSION METHOD AND APPARATUS

CROSS-REFERENCE TO RELATED APPLICATIONS

This application is a continuation of International Application No. PCT/CN2019/080265, filed on Mar. 28, 2019, the disclosure of which is hereby incorporated by reference in its entirety.

TECHNICAL FIELD

This application relates to the field of communication technologies, and in particular, to a data transmission method and an apparatus.

BACKGROUND

In a wireless communication system, in a communication system such as a long term evolution (LTE) system, data transmission can be performed only after a radio resource control (RRC) connection is established between a terminal device and a network device. A process of setting up the RRC connection can be completed only after the terminal device exchanges a plurality of pieces of signaling with the network device, and this causes relatively large signaling overheads.

However, in a machine type communication (MTC) system or a narrowband internet of things (NB-IoT) system, data transmission is characterized by a relatively small data volume and frequent data transmission. To reduce signaling overheads, a technology of performing data transmission before an RRC connection is established is proposed. For example, data transmission is performed in a random access process. This technology may be referred to as an early data transmission (EDT) technology.

Currently, in the EDT technology, downlink data is sent to the terminal device by using a message 4 in the random access process. There is other signaling before the message 4, and this results in a data transmission delay. Therefore, how to reduce the data transmission delay in the EDT technology is a technical problem to be urgently resolved currently.

SUMMARY

This application provides a data transmission method and an apparatus, to reduce a data transmission delay in an EDT technology.

According to a first aspect, a data transmission method is provided. In the method, an access network device first sends a paging message including a first indication to a terminal device. After receiving the paging message, the terminal device sends, in response to the paging message, a random access preamble corresponding to the first indication to the access network device. The access network device sends, in response to the random access preamble, a response message to the terminal device, where the response message includes downlink data and one or more of a timing advance (TA), an uplink grant (UL-Grant), a temporary cell radio network temporary identity (TC-RNTI), or a logical channel identifier (LCID).

In the foregoing technical solution, the response message that carries the downlink data and that is sent by the access network device to the terminal device may be understood as a second message (message 2, MSG2) in a random access process. In other words, in embodiments of this application, the downlink data is sent to the terminal device by using the MSG2, so that the terminal device receives the downlink data as early as possible, thereby reducing a data transmission delay.

Further, in the foregoing technical solution, the temporary cell radio network temporary identity (TC-RNTI) is carried in the response message responding to the random access preamble, that is, the TC-RNTI does not need to be carried in the paging message, so that more bits in the paging message are used to indicate a paging capacity. In this way, the paging capacity of the paging message can be increased.

In a possible design, the response message is a random access response (RAR), and the RAR includes a first field used to indicate that the RAR carries the downlink data.

In the foregoing technical solution, an RAR in a current technology may be still used to carry downlink data, and an implementation is simple.

In a possible design, the response message is further used to indicate that the access network device successfully receives the random access preamble.

In the foregoing technical solution, the response message is sent after the terminal device sends the random access preamble, and if the access network device fails to receive the preamble sent by the terminal device, the access network device does not send the response message to the terminal device. Therefore, from this perspective, the response message may be further used to indicate that the access network device successfully receives the preamble sent by the terminal device. In other words, the response message is an acknowledgement (acknowledge, ACK) message of the preamble. This can avoid a problem in the current technology that the downlink data fails to be received because the terminal device cannot learn whether the access network device successfully receives the preamble.

In a possible design, the access network device may send, to a core network device, a data request message used to request the downlink data, and the core network device sends, in response to the data request message, a data request response message including the downlink data to the access network device.

According to a second aspect, a data transmission method is provided. In the method, an access network device first sends a paging message including a first indication to a terminal device. After receiving the paging message, the terminal device sends, in response to the paging message, a random access preamble corresponding to the first indication to the access network device. The access network device sends, in response to the random access preamble, a random access response (RAR) including a temporary cell radio network temporary identity (TC-RNTI) to the terminal device, and then sends downlink data to the terminal device.

In the foregoing technical solution, after sending the RAR, the access network device sends the downlink data to the terminal device. Compared with a solution, in a current technology, of sending the downlink data to the terminal device by using the message 4, the downlink data is sent earlier, so that the terminal device receives the downlink data as early as possible, thereby reducing a data transmission delay.

Further, the access network device includes the TC-RNTI in the RAR, that is, the TC-RNTI does not need to be carried in the paging message, so that more bits in the paging message are used to indicate a paging capacity. In this way, the paging capacity of the paging message can be increased. In addition, because the RAR is sent after the terminal device sends the preamble, from this perspective, the RAR may be further used to indicate that the access network device successfully receives the preamble sent by the terminal device. In this way, this can avoid a problem in the current technology that the downlink data fails to be received because the terminal device cannot learn whether the access network device successfully receives the preamble.

In a possible design, before the access network device sends the downlink data to the terminal device, the access network device scrambles, by using the TC-RNTI carried in the RAR, a second indication that indicates a location of a time-frequency resource of the downlink data, and then sends the second indication to the terminal device.

The terminal device can receive the downlink data according to the second indication only after successfully performing blind detection on a physical downlink control channel (PDCCH) by using the TC-RNTI. In a possible design, the terminal device receives the downlink data on the time-frequency resource indicated by the second indication.

In a possible design, the access network device may send, to a core network device, a data request message used to request the downlink data, and the core network device sends, in response to the data request message, a data request response message including the downlink data to the access network device.

According to a third aspect, a data transmission method is provided. In the method, an access network device first sends a paging message including a first indication to a terminal device. After receiving the paging message, the terminal device sends, in response to the paging message, a random access preamble corresponding to the first indication to the access network device. The access network device sends, in response to the random access preamble, a random access response (RAR) including a downlink assignment (DL-assignment) to the terminal device, so that after receiving the RAR, the terminal device receives the downlink data on a time-frequency resource indicated by the DL-assignment.

In the foregoing technical solution, after sending the RAR, the access network device sends the downlink data to the terminal device on the time-frequency resource indicated by the DL-assignment carried in the RAR. Compared with a solution, in a current technology, of sending the downlink data to the terminal device by using the message 4, the downlink data is sent earlier, so that the terminal device receives the downlink data as early as possible, thereby reducing a data transmission delay.

The terminal device may obtain, from the RAR, the time-frequency resource used by the access network device to send the downlink data. In this way, duration of blindly detecting a PDCCH by the terminal device can be reduced, and data transmission efficiency can be improved.

In a possible design, the RAR includes a second field used to indicate a UL-grant, and the DL-assignment is indicated by using the second field.

In this way, the DL-assignment may be indicated without changing a format of the RAR, and an implementation is simple.

In a possible design, the RAR further includes a temporary cell radio network temporary identity (TC-RNTI).

The access network device includes the TC-RNTI in the RAR, that is, the TC-RNTI does not need to be carried in the paging message, so that more bits in the paging message are used to indicate a paging capacity. In this way, the paging capacity of the paging message can be increased. In addition, because the RAR is sent after the terminal device sends the preamble, from this perspective, the RAR may be further used to indicate that the access network device successfully receives the preamble sent by the terminal device. In this way, a problem in the current technology that the downlink data fails to be received because the terminal device cannot learn whether the access network device successfully receives the preamble can be avoided.

In a possible design, before sending the downlink data, the access network device first scrambles, by using the TC-RNTI, a second indication used to indicate a location of the time-frequency resource of the downlink data, and then sends the second indication to the terminal device. The terminal device monitors a downlink control channel by using the TC-RNTI, and after obtaining the second indication, receives the downlink data on the time-frequency resource indicated by the second indication.

In a possible design, the access network device may send, to a core network device, a data request message used to request the downlink data, and the core network device sends, in response to the data request message, a data request response message including the downlink data to the access network device.

According to a fourth aspect, an embodiment of this application provides a data transmission apparatus. The data transmission apparatus includes a processor, and the processor is coupled to a memory. The memory is configured to store instructions, and the processor is configured to execute the instructions stored in the memory, to perform the method performed by the access network device in any one of the first aspect or the possible designs of the first aspect. Optionally, the data transmission apparatus may further include the memory. Optionally, the data transmission apparatus may further include a transceiver, configured to support the data transmission apparatus in performing information sending and/or receiving in the foregoing method. Optionally, the data transmission apparatus may be an access network device, or may be an apparatus, for example, a chip or a chip system, in an access network device. The chip system includes at least one chip, and the chip system may further include another circuit structure and/or discrete component.

According to a fifth aspect, an embodiment of this application provides a data transmission apparatus, configured to implement a function performed by the access network device in the first aspect or any method in the first aspect. The data transmission apparatus includes corresponding functional modules, for example, includes a processing module and a communication module, which are separately configured to implement a step of the access network device in the first aspect or any method in the first aspect.

According to a sixth aspect, an embodiment of this application provides a data transmission apparatus. The data transmission apparatus includes a processor, and the processor is coupled to a memory. The memory is configured to store instructions, and the processor is configured to execute the instructions stored in the memory, to perform the method performed by the terminal device in any one of the first aspect or the possible designs of the first aspect. Optionally, the data transmission apparatus may further include the memory. Optionally, the data transmission apparatus may further include a transceiver, configured to support the data transmission apparatus in performing information sending and/or receiving in the foregoing method. Optionally, the data transmission apparatus may be a terminal device, or may be an apparatus, for example, a chip or a chip system, in a terminal device. The chip system includes at least one chip, and the chip system may further include another circuit structure and/or discrete component.

According to a seventh aspect, an embodiment of this application provides a data transmission apparatus, configured to implement a function performed by the terminal device in the first aspect or any method in the first aspect. The data transmission apparatus includes corresponding functional modules, for example, includes a processing module and a communication module, which are separately configured to implement a step of the terminal device in the first aspect or any method in the first aspect.

According to an eighth aspect, an embodiment of this application provides a data transmission apparatus. The data transmission apparatus includes a processor, and the processor is coupled to a memory. The memory is configured to store instructions, and the processor is configured to execute the instructions stored in the memory, to perform the method performed by the access network device in any one of the second aspect or the possible designs of the second aspect. Optionally, the data transmission apparatus may further include the memory. Optionally, the data transmission apparatus may further include a transceiver, configured to support the data transmission apparatus in performing information sending and/or receiving in the foregoing method. Optionally, the data transmission apparatus may be an access network device, or may be an apparatus, for example, a chip or a chip system, in an access network device. The chip system includes at least one chip, and the chip system may further include another circuit structure and/or discrete component.

According to a ninth aspect, an embodiment of this application provides a data transmission apparatus, configured to implement a function performed by the access network device in the second aspect or any method in the second aspect. The data transmission apparatus includes corresponding functional modules, for example, includes a processing module and a communication module, which are separately configured to implement a step of the access network device in the second aspect or any method in the second aspect.

According to a tenth aspect, an embodiment of this application provides a data transmission apparatus. The data transmission apparatus includes a processor, and the processor is coupled to a memory. The memory is configured to store instructions, and the processor is configured to execute the instructions stored in the memory, to perform the method performed by the terminal device in any one of the second aspect or the possible designs of the second aspect. Optionally, the data transmission apparatus may further include the memory. Optionally, the data transmission apparatus may further include a transceiver, configured to support the data transmission apparatus in performing information sending and/or receiving in the foregoing method. Optionally, the data transmission apparatus may be a terminal device, or may be an apparatus, for example, a chip or a chip system, in a terminal device. The chip system includes at least one chip, and the chip system may further include another circuit structure and/or discrete component.

According to an eleventh aspect, an embodiment of this application provides a data transmission apparatus, configured to implement a function performed by the terminal device in the second aspect or any method in the second aspect. The data transmission apparatus includes corresponding functional modules, for example, includes a processing module and a communication module, which are separately configured to implement a step of the terminal device in the second aspect or any method in the second aspect.

According to a twelfth aspect, an embodiment of this application provides a data transmission apparatus. The data transmission apparatus includes a processor, and the processor is coupled to a memory. The memory is configured to store instructions, and the processor is configured to execute the instructions stored in the memory, to perform the method performed by the access network device in any one of the third aspect or the possible designs of the third aspect. Optionally, the data transmission apparatus may further include the memory. Optionally, the data transmission apparatus may further include a transceiver, configured to support the data transmission apparatus in performing information sending and/or receiving in the foregoing method. Optionally, the data transmission apparatus may be an access network device, or may be an apparatus, for example, a chip or a chip system, in an access network device. The chip system includes at least one chip, and the chip system may further include another circuit structure and/or discrete component.

According to a thirteenth aspect, an embodiment of this application provides a data transmission apparatus, configured to implement a function performed by the access network device in the second aspect or any method in the second aspect. The data transmission apparatus includes corresponding functional modules, for example, includes a processing module and a communication module, which are separately configured to implement a step of the access network device in the third aspect or any method in the third aspect.

According to a fourteenth aspect, an embodiment of this application provides a data transmission apparatus. The data transmission apparatus includes a processor, and the processor is coupled to a memory. The memory is configured to store instructions, and the processor is configured to execute the instructions stored in the memory, to perform the method performed by the terminal device in any one of the third aspect or the possible designs of the third aspect. Optionally, the data transmission apparatus may further include the memory. Optionally, the data transmission apparatus may further include a transceiver, configured to support the data transmission apparatus in performing information sending and/or receiving in the foregoing method. Optionally, the data transmission apparatus may be a terminal device, or may be an apparatus, for example, a chip or a chip system, in a terminal device. The chip system includes at least one chip, and the chip system may further include another circuit structure and/or discrete component.

According to a fifteenth aspect, an embodiment of this application provides a data transmission apparatus, configured to implement a function performed by the terminal device in the third aspect or any method in the third aspect. The data transmission apparatus includes corresponding functional modules, for example, includes a processing module and a communication module, which are separately configured to implement a step of the terminal device in the third aspect or any method in the third aspect.

According to a sixteenth aspect, an embodiment of this application provides a computer-readable storage medium. The computer-readable storage medium stores a computer program. The computer program includes program instructions. When the program instructions are executed by a computer, the computer is enabled to perform the method performed by the access network device in any one of the first aspect, the second aspect, or the third aspect.

According to a seventeenth aspect, an embodiment of this application provides a computer-readable storage medium. The computer-readable storage medium stores a computer program. The computer program includes program instructions. When the program instructions are executed by a computer, the computer is enabled to perform the method performed by the terminal device in any one of the first aspect, the second aspect, or the third aspect.

According to an eighteenth aspect, an embodiment of this application provides a computer program product. The computer program product stores a computer program. The computer program includes program instructions. When the program instructions are executed by a computer, the computer is enabled to perform the method performed by the access network device in any one of the first aspect, the second aspect, or the third aspect.

According to a nineteenth aspect, an embodiment of this application provides a computer program product. The computer program product stores a computer program. The computer program includes program instructions. When the program instructions are executed by a computer, the computer is enabled to perform the method performed by the terminal device in any one of the first aspect, the second aspect, or the third aspect.

According to a twentieth aspect, this application provides a chip system. The chip system includes a processor, and may further include a memory, configured to implement the method performed by the access network device in the first aspect, the second aspect, or the third aspect. The chip system may include a chip, or may include a chip and another discrete component.

According to a twenty-first aspect, this application provides a chip system. The chip system includes a processor, and may further include a memory, configured to implement the method performed by the terminal device in the first aspect, the second aspect, or the third aspect. The chip system may include a chip, or may include a chip and another discrete component.

According to a twenty-second aspect, this application provides a storage system. The storage system includes the data transmission apparatuses in the fourth aspect and the sixth aspect, or the data transmission apparatuses in the fifth aspect and the seventh aspect, or the data transmission apparatuses in the eighth aspect and the tenth aspect, or the data transmission apparatuses in the twelfth aspect and the fourteenth aspect, or the data transmission apparatuses in the thirteenth aspect and the fifteenth aspect.

For beneficial effects of the fourth aspect to the twenty-second aspect and the implementations thereof, refer to the descriptions of the beneficial effects of the method according to the first aspect, the second aspect, or the third aspect and the implementations thereof.

BRIEF DESCRIPTION OF THE DRAWINGS

FIG. 10 is a schematic diagram of an example of a new MAC subheader according to an embodiment of this application;

DETAILED DESCRIPTION OF ILLUSTRATIVE EMBODIMENTS

Figure 1:
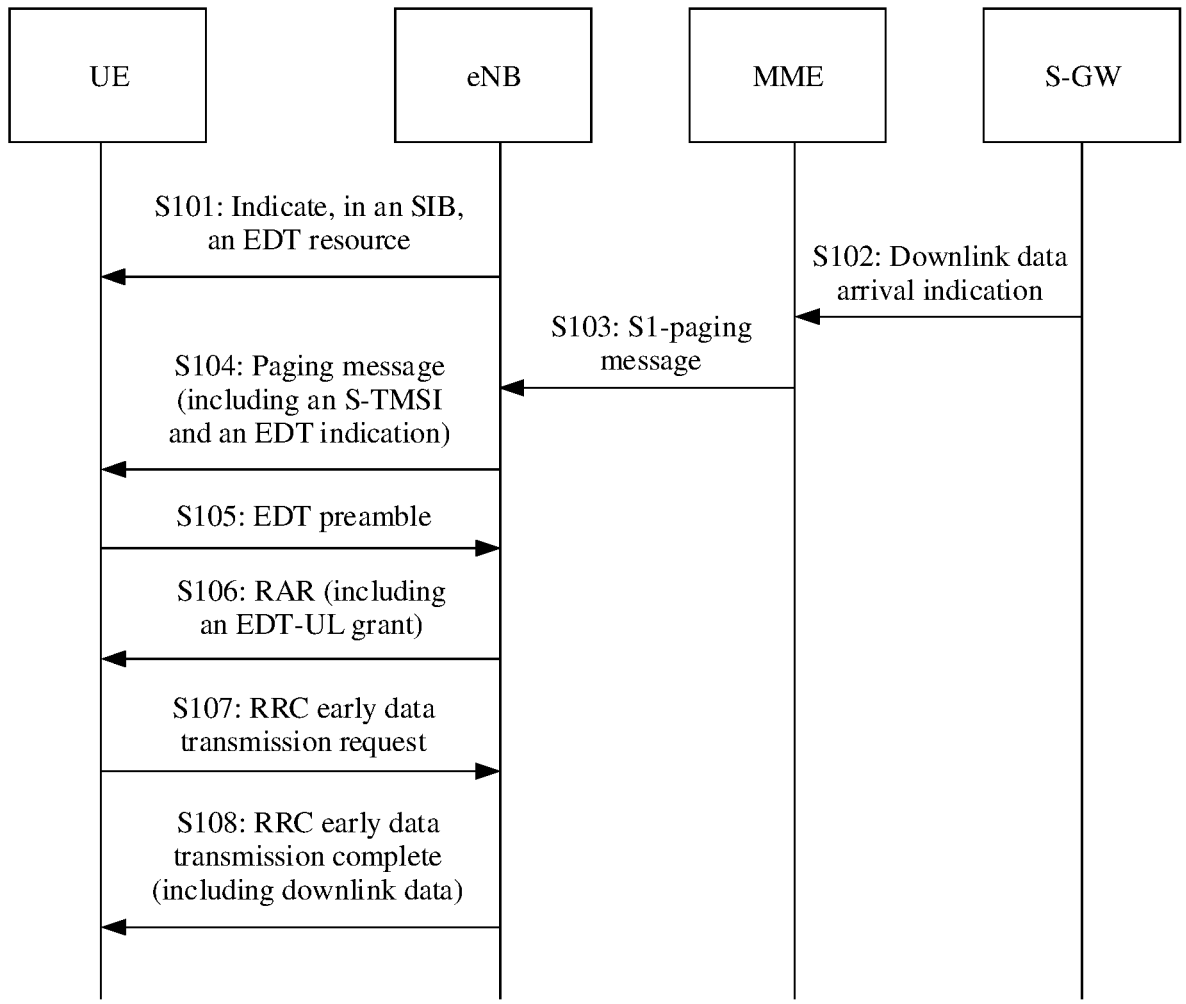
FIG. 1 is a flowchart of an example of an EDT technology in a current technology.

To make objectives, technical solutions, and advantages of the embodiments of this application clearer, the following further describes the embodiments of this application in detail with reference to the accompanying drawings.

In the following descriptions, some terms in the embodiments of this application are described, to help a person skilled in the art have a better understanding.

(1) A terminal device (terminal equipment) is also referred to as a terminal, user equipment (user equipment, UE), a mobile station (mobile station, MS), a mobile terminal (mobile terminal, MT), or the like, and is a device that provides voice and/or data connectivity for a user. For example, the terminal device may include a handheld device with a wireless connection function or a processing device connected to a wireless modem.

The terminal may communicate with a core network through a radio access network (RAN), and exchange a voice and/or data with the RAN. The terminal may include user equipment (UE), a wireless terminal, a mobile terminal, a subscriber unit, a subscriber station, a mobile station, a remote station, an access point (AP), a remote terminal, an access terminal (access terminal), a user terminal, a user agent, a user device, or the like.

For example, the terminal may include a mobile phone (or referred to as a "cellular" phone), a computer with a mobile terminal, a portable, pocket-sized, handheld, computer built-in, or in-vehicle mobile apparatus, and an intelligent wearable device. For example, the terminal device is a device such as a personal communications service (personal communication service, PCS) phone, a cordless phone, a session initiation protocol (SIP) phone, a wireless local loop (WLL) station, or a personal digital assistant (PDA).

Alternatively, the terminal device may further include a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example and not limitation, in the embodiments of this application, an intelligent wearable device is a generic term for wearable devices such as glasses, gloves, watches, clothes, and shoes that are developed based on intelligent design of daily wearing by using wearable technologies. The intelligent wearable device is a portable device that can be directly worn by a user or integrated into clothes or an accessory of a user.

The intelligent wearable device is not only a hardware device, but is used to implement powerful functions through software support, data exchange, and cloud interaction. In a broad sense, the intelligent wearable device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

Alternatively, the terminal may be a virtual reality (VR) device, an augmented reality (AR) device, a wireless terminal in industrial control, a wireless terminal in self driving (driverless), a wireless terminal in remote medical surgery, a wireless terminal in a smart grid, a wireless terminal in transportation safety, a wireless terminal in a smart city, a wireless terminal in a smart home, or the like.

(2) A (radio) access network ((R)AN) device, for example, including a base station (for example, an access point), may be a device that communicates, on an air interface, with a wireless terminal through one or more cells in an access network. The (radio) access network device may be configured to perform mutual conversion between a received over-the-air frame and an internet protocol (IP) packet, and serve as a router between a terminal device and a remaining portion of the access network, and the remaining portion of the access network may include an IP network. The (radio) access network device may further coordinate attribute management of the air interface.

For example, the (radio) access network device may include a radio network controller (RNC), a NodeB (Node B, NB), a base station controller (BSC), a base transceiver station (BTS), a home base station (for example, a home evolved NodeB, or a home Node B, HNB), a baseband unit (base band unit, BBU), or a wireless fidelity (Wi-Fi) access point (AP).

The (radio) access network device may also include a long term evolution (LTE) system, an LTE-Advanced (LTE-A) system, or an evolved base station (NodeB, eNB, or e-NodeB, evolutional Node B) in a 4th generation mobile communication technology (4G) system.

Alternatively, the (radio) access network device may include a next generation NodeB (next generation node B, gNB), a transmission reception point (transmission and reception point, TRP), or a transmission point (TP) in a 5G system or a new radio (NR) system.

Alternatively, the (radio) access network device may include a centralized unit (centralized unit, CU) and/or a distributed unit (DU) in a cloud access network (cloud radio access network, CloudRAN) system. This is not limited in the embodiments of this application. In the embodiments of this application, the technical terms "(radio) access network device" and "access network device" may be used interchangeably.

(3) A core network (CN) device is connected to a plurality of access networks, and includes a circuit switched (CS) domain and/or a packet switched (PS) domain. CS network elements are a mobile switching center, a visited location register, and a gateway mobile switching center, and PS network elements are a general packet radio service (GPRS) node and a gateway GPRS support node. Some network elements such as a home location register, the visited location register, and an authentication center may be shared by the CS domain and the PS domain.

(4) "A plurality of" in the embodiments of this application means two or more than two. In view of this, "a plurality of" in the embodiments of this application may also be understood as "at least two". The term "at least one" may be understood as one or more, for example, understood as one, two, or more.

For example, including at least one means including one, two, or more, and does not limit which are included. For example, including at least one of A, B, and C means that A, B, C, A and B, A and C, B and C, or all of A, B, and C may be included.

The term "and/or" describes an association relationship between associated objects and indicates that three relationships may exist. For example, A and/or B may indicate the following three cases: Only A exists, both A and B exist, and only B exists.

In addition, unless otherwise specified, the character "/" generally indicates an "or" relationship between associated objects. The terms "system" and "network" may be used interchangeably in the embodiments of this application.

Unless otherwise stated on the contrary, ordinal numerals such as "first" and "second" in the embodiments of this application are used to distinguish between a plurality of objects, and are not intended to limit a sequence, a time sequence, a priority, or an importance degree of the plurality of objects.

The foregoing describes some concepts in the embodiments of this application. The following describes technical features in the embodiments of this application.

An MTC system or an NB-IoT system is a component of a next generation communication system, for example, a 5G system, and has rapidly increasing market requirements. Compared with a conventional cellular network, in the MTC system or the NB-IoT system, there are more connected terminal devices. For example, for internet of things terminal devices such as smart water/electricity meters, smart households, cars, or wearable devices that are deployed on a large scale, there may be a large quantity of terminal devices (for example, more than tens of thousands) of the foregoing types under one NB-IoT base station. In addition, a service volume of the terminal device is relatively large, and a data packet generated by a service is smaller.

In the conventional cellular network, when a terminal device communicates with an access network device, radio resource control (RRC) needs to be established. However, an RRC connection establishment process can be completed only after the terminal device exchanges a plurality of pieces of signaling with the network device. Therefore, to reduce signaling overheads in the MTC system or the NB-IoT system, an EDT technology is proposed. In this way, before setting up an RRC connection, the terminal device can perform transmission of a data packet of a small data volume with the access network device.

FIG. 1 is a flowchart of an example of an EDT technology in a current technology.

S101: An eNB sends EDT configuration information.

The eNB may indicate, by using a system information block (system information block, SIB), the EDT configuration information allocated to UE. The EDT configuration information may include an EDT physical random access channel (physical random access channel, PRACH) resource.

S102: A serving gateway (SGW) sends a downlink data indication to a mobility management entity (MME).

S103: The MME sends an S1-paging message.

The MME sends the paging message to the eNB through an S1 interface. The paging message includes a serving-temporary mobile subscriber identity (S-TMSI) and an EDT indication of UE to be paged, and the EDT indication is used to indicate the UE to receive data by using the EDT technology.

S104: The eNB sends the paging message to the UE.

The paging message carries the S-TMSI and the EDT indication that are carried in the S1-paging message received by the eNB from the MME.

S105: The UE sends a preamble to the eNB.

Specifically, after the UE determines that the paging message is for the UE, the UE determines to initiate an EDT procedure. The UE determines, based on the PRACH resource in the EDT configuration information sent by the eNB, a preamble corresponding to the PRACH resource, and sends the preamble to the eNB.

S106: The eNB sends a random access response (RAR) message to the UE.

The RAR carries resource indication information used for uplink data transmission, for example, an uplink scheduling grant (UL grant).

S107: The UE sends an RRC early data transmission request (early data request) to the eNB.

The RRC early data request carries the S-TMSI, a connection establishment cause (estab cause), and a non-access stratum packet data unit (NAS PDU). The NAS PDU is data corresponding to the paging message. The connection establishment cause may be indicated as mobile originated (mobile originate, MO)-EDT (that is, EDT initiated by the UE, or referred to as uplink EDT), or mobile terminated (mobile terminate, MT)-EDT (that is, EDT initiated by a network, or referred to as downlink EDT).

The UE sends the RRC early data request by using a resource indicated by the resource indication information that is carried in the RAR and that is used for uplink data transmission. The RRC early data request may be understood as a third message (message 3, MSG3) in a random access process.

S108: The eNB sends an RRC early data transmission complete message (RRC early data complete) to the UE.

Specifically, after the eNB receives the MSG3 carrying the NAS PDU, the eNB sends the NAS PDU to the MME. After the MME receives the NAS PDU, the MME sends downlink data to the eNB, so that the eNB sends the received downlink data to the UE.

The RRC early data complete includes the downlink data. The RRC early data complete may be understood as a fourth message (message 4, MSG4) in the random access process.

It can be learned that in the foregoing process, the downlink data is carried when the MSG4 is sent to the terminal device, and before the downlink data is sent, other signaling exists, causing a data transmission delay. Therefore, how to reduce the data transmission delay in the EDT technology is a technical problem to be urgently resolved currently.

In view of this, an embodiment of this application provides a data transmission method. In the method, if downlink data needs to be sent to a terminal device, an access network device may first send a paging message to the terminal device. After receiving the paging message, the terminal device determines, based on a first indication included in the paging message, a random access preamble used to initiate EDT, and sends the random access preamble to the access network device. After receiving the random access preamble, the access network device sends a response message to the terminal device, where the response message includes the downlink data and one or more of a timing advance (TA), an uplink grant (UL-Grant), a temporary cell radio network temporary identity (TC-RNTI), or a logical channel identifier (LCID).

In the foregoing technical solution, the response message that carries the downlink data and that is sent by the access network device to the terminal device may be understood as a second message (message 2, MSG2) in a random access process. In other words, in this embodiment of this application, the downlink data is sent to the terminal device by using the MSG2, so that the terminal device receives the downlink data as early as possible, thereby reducing a data transmission delay.

Further, in the foregoing technical solution, the temporary cell radio network temporary identity (TC-RNTI) is carried in the response message responding to the random access preamble, that is, the TC-RNTI does not need to be carried in the paging message, so that more bits in the paging message are used to indicate a paging capacity. In this way, the paging capacity of the paging message can be increased.

The following describes an application scenario of the embodiments of this application.

Figure 2A:
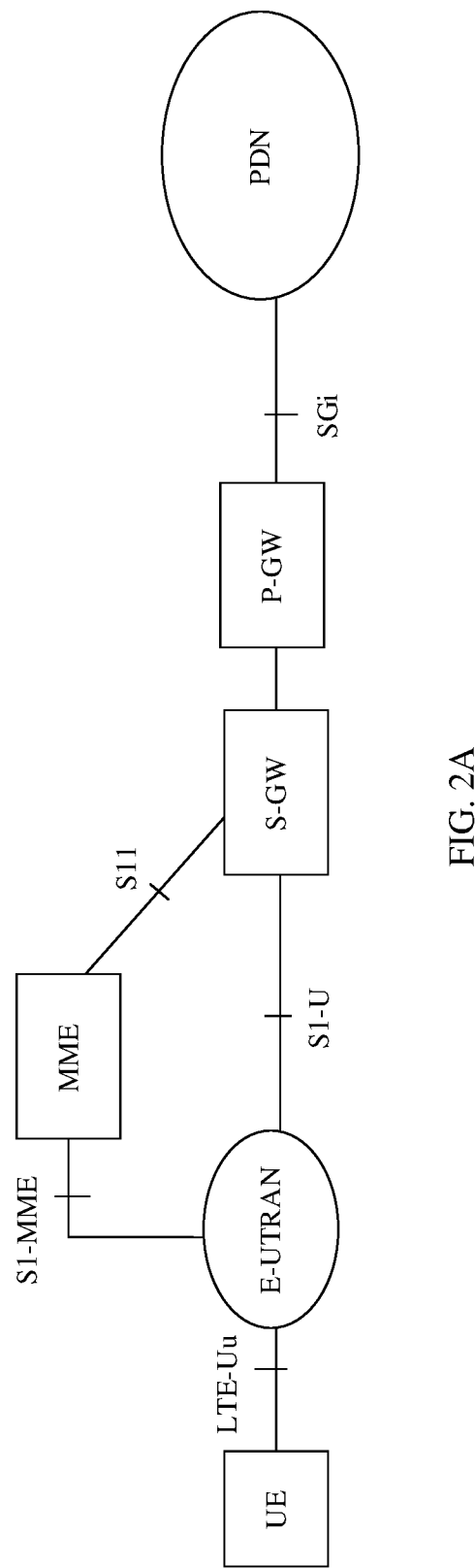
FIG. 2A is a schematic diagram of a specific communication system architecture to which an embodiment of this application is applicable.

FIG. 2A is a schematic diagram of a specific communication system architecture to which an embodiment of this application is applicable. The communication system architecture shown in FIG. 2A includes two parts: a radio access network and a core network. The radio access network is an evolved universal terrestrial radio access network (E-UTRAN), and is configured to implement a function related to radio access. The core network includes an MME, an SGW, a packet data network gateway (PGW), and the like. The MME is mainly responsible for mobility management and session management on a control plane. The SGW is a user plane function entity, and routes and forwards packet data. The PGW is a gateway connected to an external data network. In actual network deployment, the S-GW and the P-GW may alternatively be deployed together, and may be collectively referred to as a gateway. UE may access an external PDN by establishing a connection from the UE to the E-UTRAN, then to the SGW, then to the PGW, and then to the packet data network (PDN).

Figure 2B:
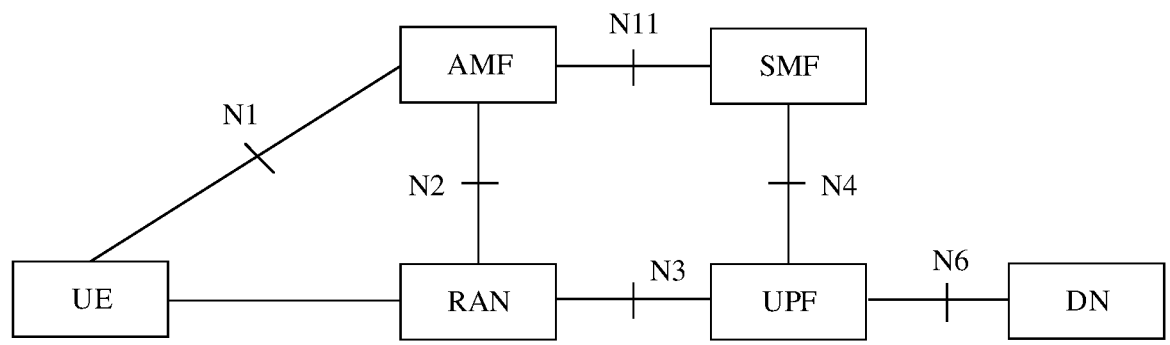
FIG. 2B is a schematic diagram of another specific communication system architecture to which an embodiment of this application is applicable.

FIG. 2B is a schematic diagram of another specific communication system architecture to which an embodiment of this application is applicable. The communication system architecture shown in FIG. 2B is also divided into two parts: a radio access network and a core network. The radio access network is a next generation radio access network (NG-RAN), and is configured to implement a function related to radio access. The core network includes an access and mobility management function (core access and mobility management function, AMF) network element, a session management function (SMF) network element, a user plane function (UPF) network element, and the like. The AMF network element is mainly responsible for mobility management. The AMF network element may also be referred to as an AMF device or an AMF entity. The SMF network element is mainly responsible for session management. The SMF network element may also be referred to as an SMF device or an SMF entity. The UPF is mainly responsible for processing, for example, forwarding, a packet of a user. UE may access a DN by establishing a session from the UE, to the NG-RAN, then to the UPF, and then to the data network (DN).

It should be understood that, the communication system architectures provided in the embodiments of this application may be used for a 5G system, a long term evolution-advanced (LTE-A) system, a worldwide interoperability for microwave access (WiMAX) system, a wireless local area network (WLAN) system, or the like.

In addition, the communication system architectures are further applicable to a future-oriented communication technology. The communication system architectures described in the embodiments of this application are intended to describe the technical solutions in the embodiments of this application more clearly, and constitute no limitation on the technical solutions provided in the embodiments of this application. A person of ordinary skill in the art may learn that, with evolution of network architectures, the technical solutions provided in the embodiments of this application are also applicable to a similar technical problem.

The following describes, with reference to the accompanying drawings, the technical solutions provided in the embodiments of this application.

Figure 3:
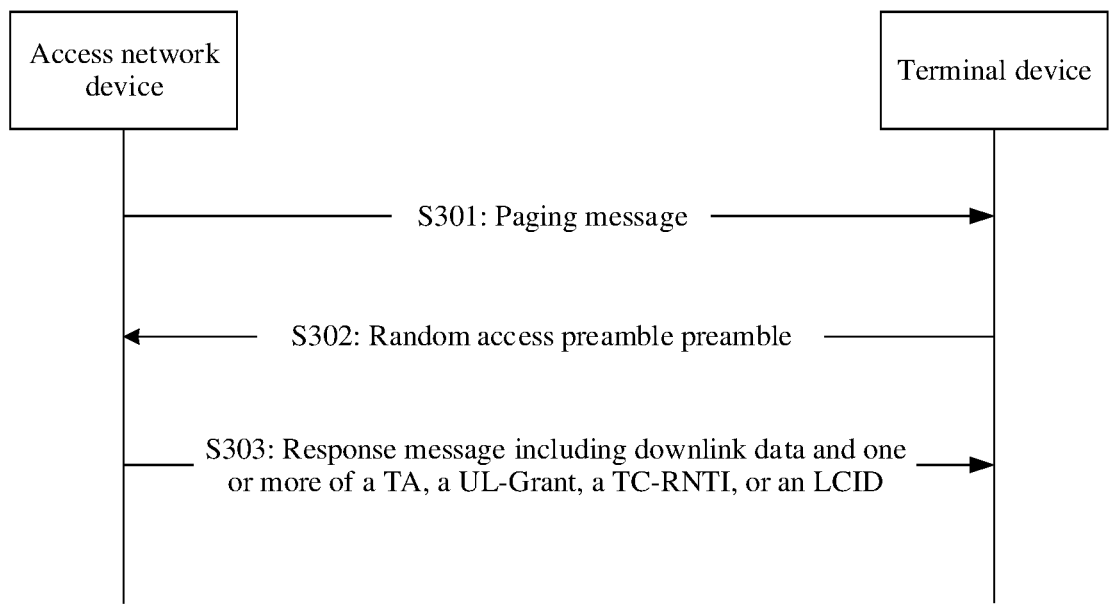
FIG. 3 is a flowchart of a data transmission method according to an embodiment of this application.

An embodiment of this application provides a data transmission method. FIG. 3 is a flowchart of the method.

It should be noted that, when the method is used in a communication system shown in FIG. 2A, an access network device described below may be an access network device in the communication system architecture shown in FIG. 2A, for example, may be an eNB, a terminal device described below may be a terminal device in the communication system architecture shown in FIG. 2A, and a core network device described below may be a core network device in the communication system architecture shown in FIG. 2A, for example, may be an MME network element. When the method is used in a communication system shown in FIG. 2B, an access network device described below may be an access network device in the communication system architecture shown in FIG. 2B, for example, may be a gNB, a terminal device described below may be a terminal device in the communication system architecture shown in FIG. 2B, and a core network device described below may be a core network device in the communication system architecture shown in FIG. 2B, for example, may be an AMF network element.

For ease of description, an example in which the method is used in the communication system architecture shown in FIG. 2A is used.

S301: The access network device sends a paging message to the terminal device, and the terminal device receives the paging message.

In this embodiment of this application, the paging message includes a first indication, and the first indication is used to indicate a random access channel resource allocated by the access network device to the terminal device. The random access channel may be a physical random access channel (PRACH), a machine type communication physical random access channel (MTC physical random access channel, MPRACH), a narrowband physical random access channel (NPRACH), or an enhanced physical random access channel (EPRACH). For ease of description, the following provides descriptions by using an example in which the random access channel is a PRACH.

A PRACH resource is a preamble allocated to the terminal device, or a time-frequency resource that is allocated to the terminal device and used for random access, or a preamble allocated to the terminal and a time-frequency resource that is allocated to the terminal and used for random access.

In an example, the first indication may indicate a time-frequency resource on which a PRACH allocated to the terminal device is located. Alternatively, the access network device establishes mapping information of a PRACH resource for each terminal device, where the mapping information includes a time-frequency resource of each of all PRACH channels supported by the access network device. In this case, the first indication may indicate an index number, a number, or the like of the PRACH, so that the terminal device can determine, based on the index number or the number of the PRACH, a frequency domain position of the PRACH.

In another example, the terminal device and the access network device further store a correspondence between a PRACH resource and a preamble. In this case, the first indication may indicate an identifier of a preamble corresponding to a PRACH allocated to the terminal device, for example, an index number or a number of the preamble.

Certainly, the first indication may alternatively indicate, in another manner, the random access channel resource allocated to the terminal device. This is not limited herein.

In a possible implementation, the paging message may further include an EDT indication, and the first indication may be used to indicate that there is downlink data that needs to be delivered to the terminal device, or the first indication may be used to indicate the terminal device to trigger an EDT procedure.

S302: The terminal device sends, in response to the paging message, a random access preamble to the access network device, and the access network device receives the random access preamble.

In this embodiment of this application, the random access preamble sent by the terminal device corresponds to the first indication in the paging message. Specifically, after receiving the paging message, the terminal device first determines, based on the stored correspondence between a PRACH resource and a preamble, a preamble corresponding to a PRACH resource indicated by the paging message, and then sends the preamble to the access network device.

S303: The access network device sends, in response to the random access preamble, a response message to the terminal device, and the terminal device receives the response message.

In this embodiment of this application, the response message includes downlink data and one or more of a timing advance (TA), an uplink grant (UL-Grant), a temporary cell radio network temporary identity (TC-RNTI), or a logical channel identifier (LCID). It should be noted that in this case, the downlink data is carried in RRC signaling.

The following describes the response message. The response message may have but is not limited to the following two forms.

A first form is as follows:

The response message may be understood as a random access response (RAR) that carries the downlink data. In other words, a data field is added to a structure of a media access control (MAC) protocol data unit (PDU) of an RAR in a current technology, and the downlink data is carried in the data field.

To clearly describe the response message in this embodiment of this application, the following describes a structure of a MAC PDU in a random access process.

Figure 4:
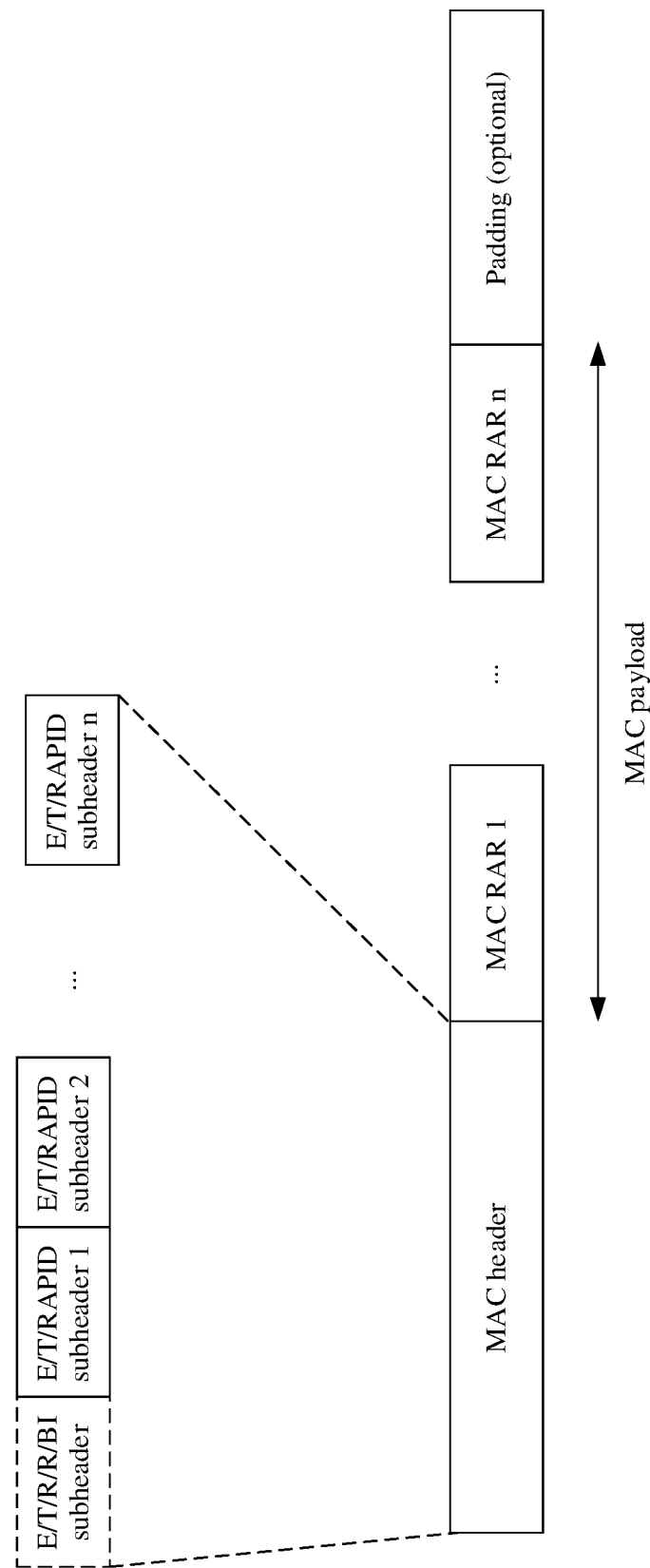
FIG. 4 is a schematic diagram of an example of a medium access control (MAC) protocol data unit (PDU) in a random access process.

FIG. 4 is a schematic diagram of an example of a MAC PDU in a random access process. The MAC PDU in the random access process includes three parts: a MAC header, a payload, and a possible padding.

Figure 5A:
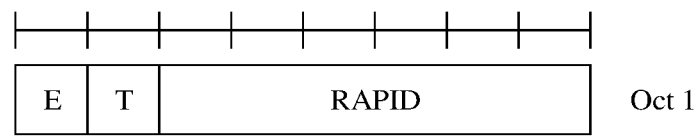
FIG. 5A is a schematic diagram of a first format of a MAC subheader.
Figure 5B:
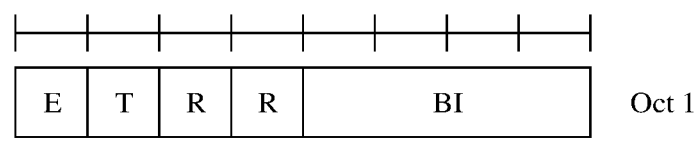
FIG. 5B is a schematic diagram of a second format of a MAC subheader.

The MAC header includes one or more MAC subheaders (subheader). FIG. 5A and FIG. 5B show two specific formats of the MAC subheader.

In FIG. 5A, the MAC subheader includes an E field, a T field, and a random access preamble identifier (RAPID) field. In FIG. 5B, the MAC subheader includes an E field, a T field, two R fields, and a backoff indicator (backoff indicator, BI) field. The following describes the fields.

The E field is an extension field, and is used to indicate whether there is a MAC subheader subsequently, and a value of the field may be 0 or 1. When the value of the field is 1, it indicates that there is another MAC subheader following the MAC subheader. When the value of the field is 0, it indicates that there is no other MAC subheader following the MAC subheader.

The T field is a type field, and is used to indicate whether the MAC subheader carries the RAPID field or the BI field, and a value of the field may be 0 or 1. When the value of the field is 1, it indicates that the MAC subheader carries the RAPID field. When the value of the field is 0, it indicates that the MAC subheader carries the BI field.

The R field is a reserved field and has a fixed value of 0.

The BI field is used to indicate a maximum delay from time at which the RAR is not successfully received last time to time at which the preamble is resent next time, and uses a unit of ms. The BI field occupies four bits, and a value of the BI field may range from 0 to 15.

The RAPID field occupies six bits, and a value of the field ranges from 0 to 63.

Figure 6:
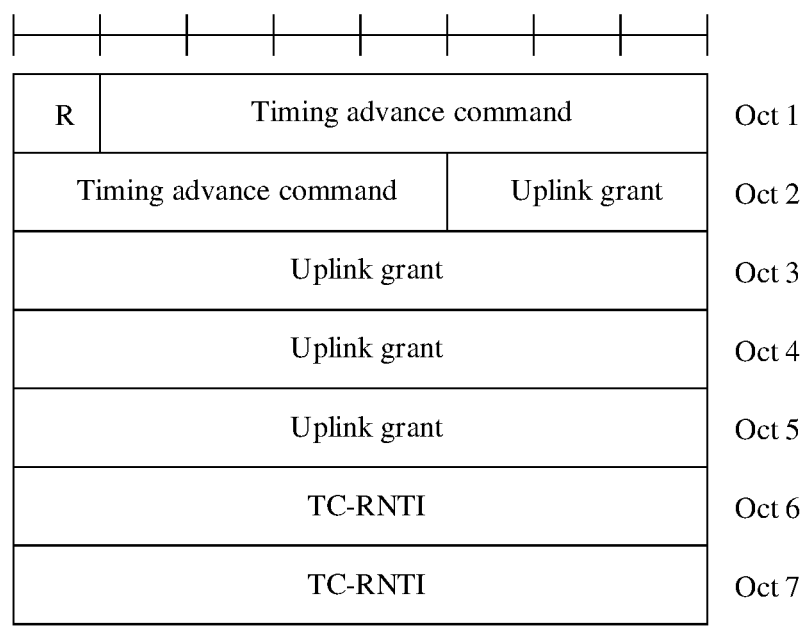
FIG. 6 is a schematic diagram of a format of a MAC RAR in a MAC PDU.

The payload includes one or more RARs, and a specific quantity depends on a quantity of corresponding RAPID fields in the MAC subheader. If the MAC PDU is a response to two preambles, the MAC PDU includes two RARs. Refer to FIG. 6. A format of the RAR is as follows:

The RAR includes six bytes, and specifically includes an R field, a timing advance command field, an uplink grant (UL grant) field, and a TC-RNTI field.

The R field is a reserved field.

The timing advance command (timing advance command) field is used to indicate a TA value used by the terminal device to perform uplink synchronization, and usually occupies 11 bits.

The UL Grant field is used to indicate parameters such as a time-frequency resource and power control that are used by the terminal device to perform uplink transmission of an MSG3. The parameters are not described one by one herein. The UL Grant field usually occupies 20 bits.

The TC-RNTI field is used to indicate a TC-RNTI of the terminal device, and usually occupies 16 bits. When sending the MSG3, the terminal device scrambles the MSG3 by using the value.

Figure 7A:
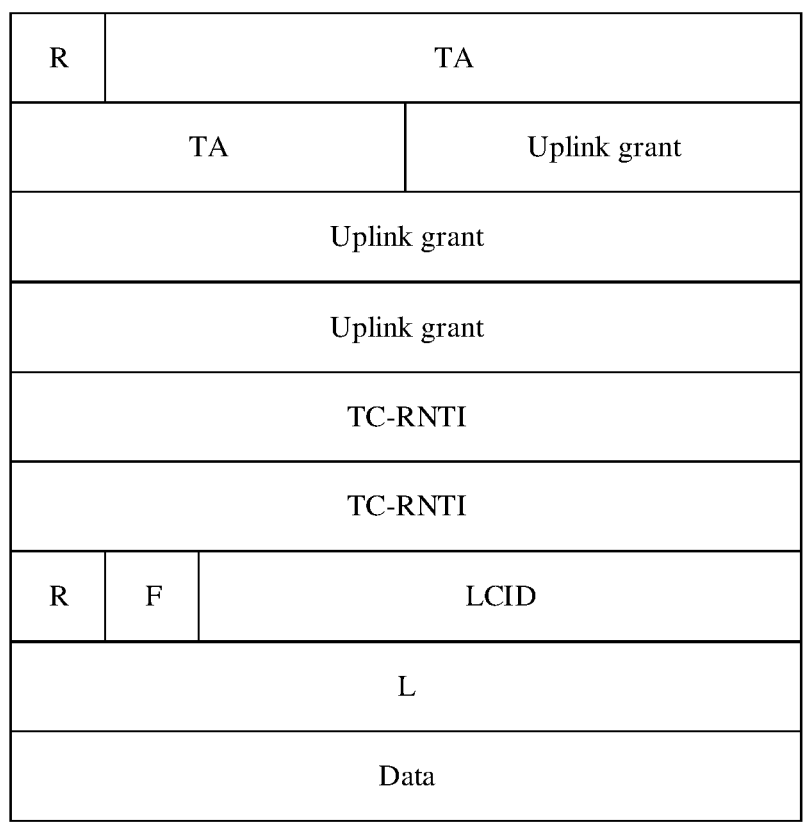
FIG. 7A is a schematic diagram of a format of an RAR included in a payload of a response message according to an embodiment of this application.
Figure 7B:
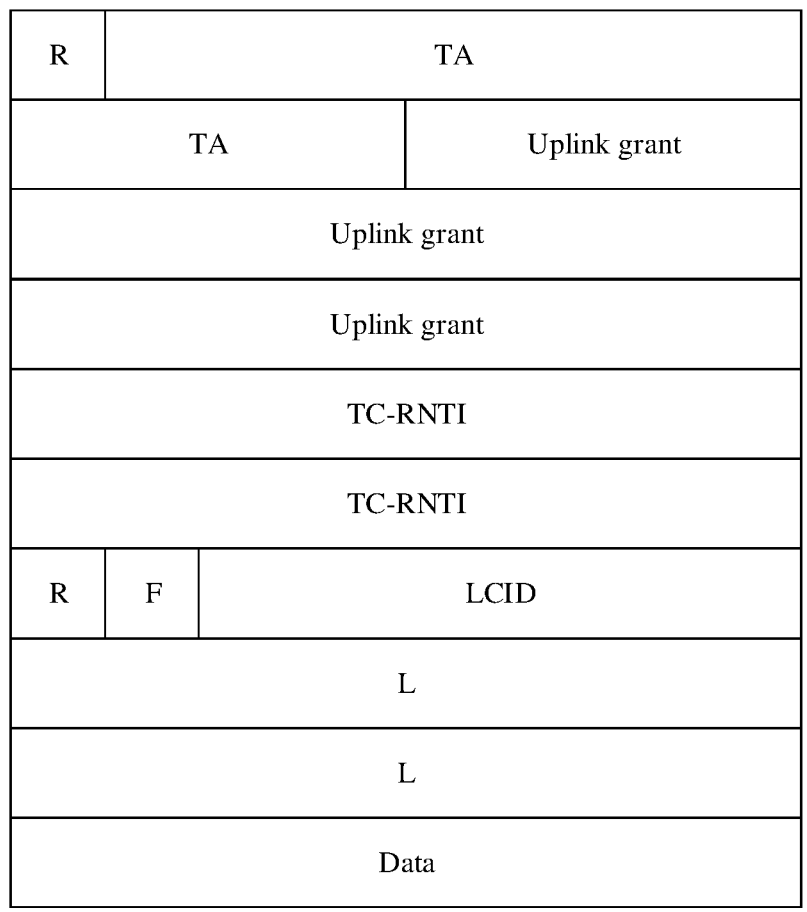
FIG. 7B is a schematic diagram of another format of an RAR included in a payload of a response message according to an embodiment of this application.

The foregoing describes a format of the MAC PDU in the random access process in a current technology. In this embodiment of this application, to enable the MAC PDU of the response message to carry the downlink data, a manner used is as follows: A format of the MAC subheader in the MAC PDU in the random access process in the current technology is still used, and a data field is added to the RAR in the payload. FIG. 7A and FIG. 7B are each a schematic diagram of a format of an RAR included in a payload of a response message according to an embodiment of this application. In the RAR shown in FIG. 7A, an R field, an F field, an LCID field, an L field, and a data (data) field are added to the RAR. It is different from a format of the RAR shown in FIG. 7A that, the RAR shown in FIG. 7B includes two L fields.

The following describes the newly added fields in FIG. 7A and FIG. 7B.

LCID: a logical channel ID field, identifying a logical channel corresponding to the RAR or a type or a padding of the RAR. The LCID field may occupy six bits.

L: a length field, indicating a length of the data field. The L field may occupy eight bits.

F: a format field, indicating a length of the length field (L field). For example, whether the L field is eight bits or 16 bits may be indicated, and the F field may occupy one bit.

The newly added R field is a reserved field.

It should be noted that, if the LCID field indicates a common control channel (CCCH), the L field may be omitted.

To enable a terminal device to learn, as soon as possible, whether a response message used by an access network device to respond to a preamble of the terminal device includes downlink data, the RAR may include a first field, where the first field is used to indicate that the RAR carries the downlink data.

Figure 7C:
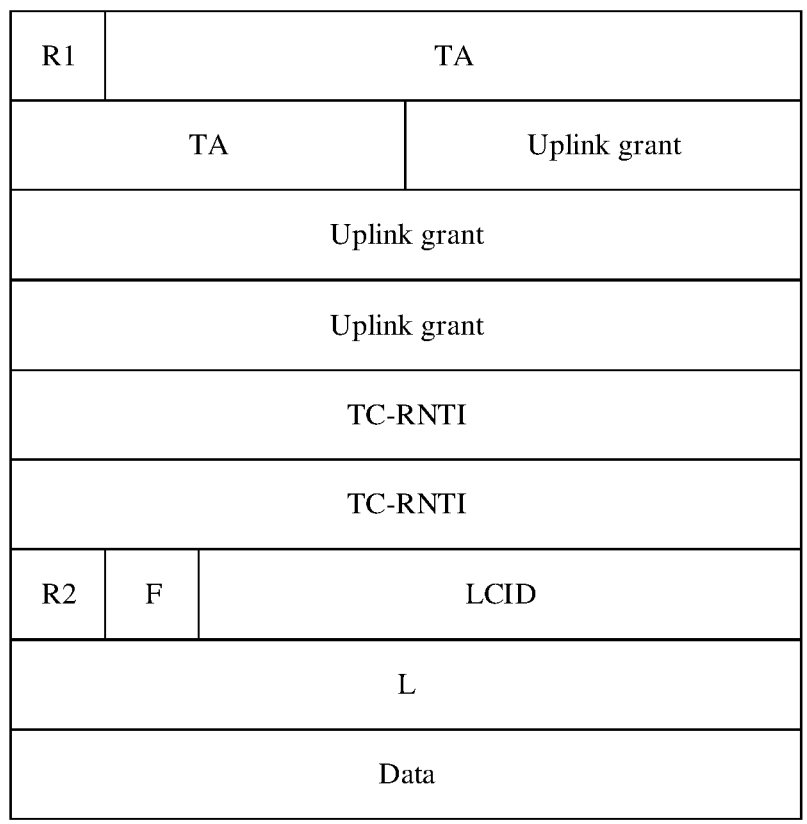
FIG. 7C is a schematic diagram of another format of an RAR included in a payload of a response message according to an embodiment of this application.

For example, in each of subheaders shown in FIG. 7A to FIG. 7B, the first R field is used to indicate whether the RAR includes the downlink data. Refer to FIG. 7C. An R field used to indicate whether the RAR includes the downlink data is marked as an R1 field, and the other R field in the RAR is marked as an R2 field, that is, the R2 field is a reserved field. When a value of the R0 field is 0, it may indicate that the RAR does not include the downlink data, that is, the RAR is an MSG2 in a current technology. When a value of the R1 field is 1, it may indicate that the RAR includes the downlink data. Certainly, a value and specific indication content of the R1 field may be set based on a use requirement. This is not limited herein.

A second form is as follows:

The response message is different from an RAR in a current technology. The response message uses a new MAC PDU structure, and the new MAC PDU structure includes a data field carrying the downlink data. In other words, in this case, the response message is not an RAR in a random access process, or may be understood as a MAC PDU used for data transmission.

To clearly describe the response message in this embodiment of this application, the following describes a structure of a MAC PDU in a non-random access process in a current technology.

Figure 8:
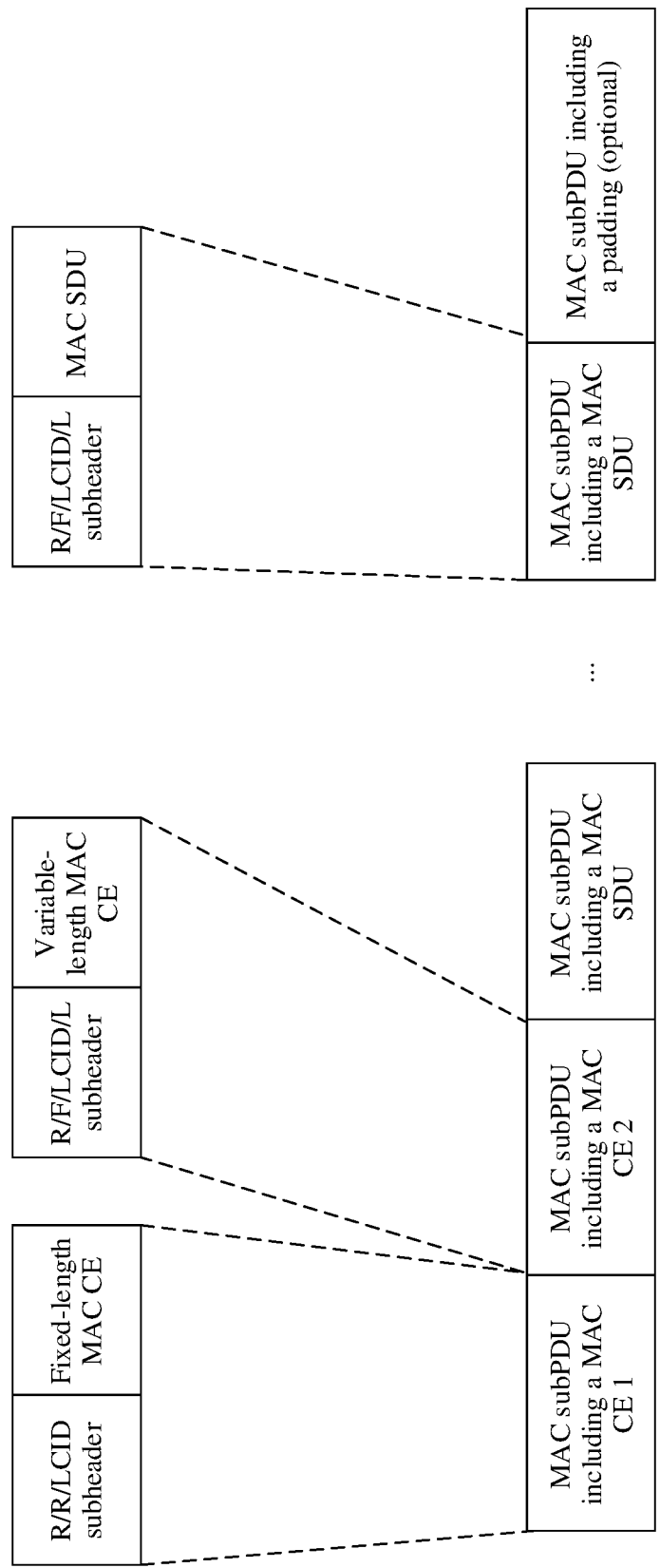
FIG. 8 is a schematic diagram of an example of a structure of a MAC PDU in a non-random access process in a current technology.

FIG. 8 shows an example of a structure of a MAC PDU in a non-random access process in a current technology. As shown in FIG. 8, one MAC PDU includes a plurality of MAC sub protocol data units (subPDU). One MAC subPDU may include the following three cases:

1. Including one MAC PDU subheader (subheader) and one MAC service data unit (service data unit, SDU);

2. Including one MAC PDU subheader (subheader) and one media access control control element (media access control control element, MAC CE); and 3. Including a possible padding (padding).

Figure 9A:
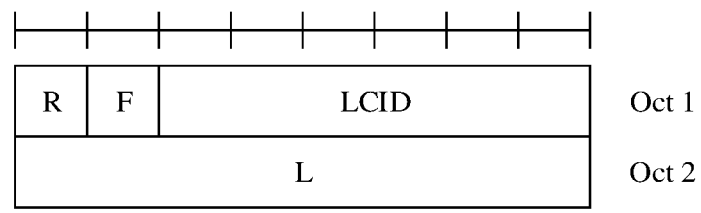
FIG. 9A is a schematic diagram of a first format of a subheader of a MAC subPDU.
Figure 9B:
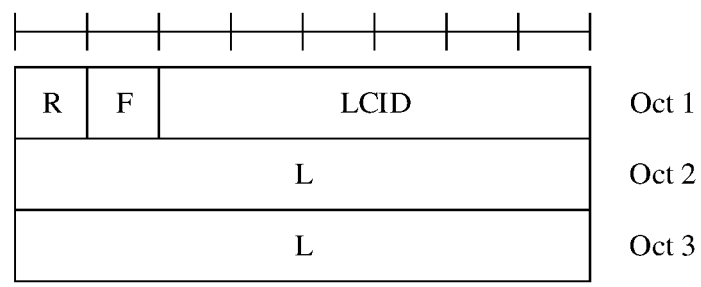
FIG. 9B is a schematic diagram of a second format of a subheader of a MAC subPDU.
Figure 9C:
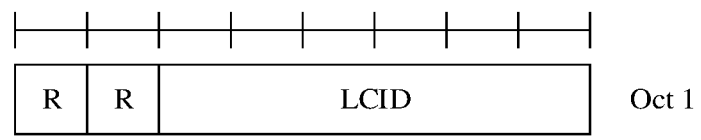
FIG. 9C is a schematic diagram of a third format of a subheader of a MAC subPDU.

In this case, a subheader format of the MAC subPDU includes three cases shown in FIG. 9A to FIG. 9C. The subheader format shown in FIG. 9A includes an R field, an F field, an LCID field, and an L field. The subheader format shown in FIG. 9B includes an R field, an F field, an LCID field, and two L fields. The subheader format shown in FIG. 9C includes an R field, an F field, and an LCID field. The subheader format shown in FIG. 9C is used for a MAC CE of a definite size, for a padding, and for a data packet whose transmission is performed on a common control channel (common control channel, CCCH). The following describes the fields included in a subheader of the MAC subPDU.

LCID: a logical channel ID field, identifying a logical channel corresponding to the MAC subPDU or a type or a padding of the MAC CE. The LCID field may occupy six bits.

L: a length field, indicating a quantity of bytes of a MAC SDU in the MAC subPDU. The L field may occupy eight bits.

F: a format field, indicating a length of the length field. For example, whether the L field is eight bits or 16 bits may be indicated, and the F field may occupy one bit.

The R field is a reserved field.

In this case, a new MAC subheader is designed, so that the MAC PDU shown in FIG. 8 can be used for transmission of downlink data. FIG. 10 is a schematic diagram of an example of a new MAC subheader according to an embodiment of this application.

In FIG. 10, there is an R field, an F field, an LCID field, a TA field, a UL grant field, a TC-RNTI field, an L field, and a data (data) field. The L field is used to indicate a length of the data field. Meanings of the other fields are the same as corresponding content in the foregoing, and details are not described herein again.

It should be noted that, if the LCID field indicates a CCCH, the L field may be omitted.

In addition, it should be noted that a form of a response message used by the access network device may be pre-agreed on by the terminal device and the access network device, or may be indicated by the access network device. This is not limited herein. When the access network device sends a response message in the second form to the terminal device, the PRACH resource indicated in the paging message in step S301 is dedicated to the terminal device, and cannot be shared with another terminal device.

In this embodiment of this application, the response message is sent after the terminal device sends the preamble, and if the access network device fails to receive the preamble sent by the terminal device, the access network device does not send the response message to the terminal device. Therefore, from this perspective, the response message may be further used to indicate that the access network device successfully receives the preamble sent by the terminal device. In other words, the response message is an acknowledgement (acknowledge, ACK) message of the preamble. In this way, this can avoid a problem in the current technology that the downlink data fails to be received because the terminal device cannot learn whether the access network device successfully receives the preamble.

Before the access network device sends the downlink data to the terminal device by using the response message, the access network device may obtain the downlink data in manners that are, but not limited to, the following manners:

Manner 1: Before step S301, the core network device actively sends a first message to the access network device, where the first message includes the downlink data sent to the terminal device. The first message carries an identifier of the terminal device. For example, the identifier of the terminal device may be an SAE-temporary mobile subscriber identity (SAE-temporary mobile subscriber identity, S-TMSI), or the identifier of the terminal device may be used to indicate an identifier of a context of the terminal device, to determine the terminal device by using the identifier of the context of the terminal device. For example, the identifier of the context may be an S1 AP ID allocated by the MME, and the identifier is used to obtain the context of the terminal device from the MME. Alternatively, the identifier of the context may be an identifier allocated by the access network device. For example, a resume identifier (resume ID) is an identifier allocated by a base station that communicates with the terminal device last time, and the identifier is carried in a terminal device context suspend request (UE context suspend request) sent to the MME by the base station that communicates with the terminal device last time.

Manner 2: Before step S303, the access network device sends, to the core network device, a data request message used to request the downlink data, and obtains the downlink data from a data request response message that is sent by the core network device and that includes the downlink data.

In the manner 2, when the access network device fails to obtain the downlink data from the core network device, that is, does not successfully obtain the downlink data from the core network device, the response message in step S303 does not carry the downlink data, that is, the response message in step S303 is the RAR in the random access process, and the response message carries an RRC connection setup (RRC connection setup) message in a field carrying the downlink data, so that when the terminal device determines that the response message is the RAR, the terminal device establishes an RRC connection based on the RAR. In this case, one piece of indication information may be used to indicate that the RAR carries the RRC connection setup message. For example, the indication may be performed by using one bit in a MAC PDU of the RAR, or may be implicitly performed by using an LCID, or may be performed by using RRC layer indication information.

It can be learned from the foregoing technical solution that the access network device may send the downlink data to the terminal device by using the MSG2, so that the terminal device receives the downlink data as early as possible, to reduce a data transmission delay. In addition, the access network device includes the TC-RNTI in the response message, that is, the TC-RNTI does not need to be carried in the paging message, so that more bits in the paging message are used to indicate a paging capacity. In this way, the paging capacity of the paging message can be increased.

Figure 11:
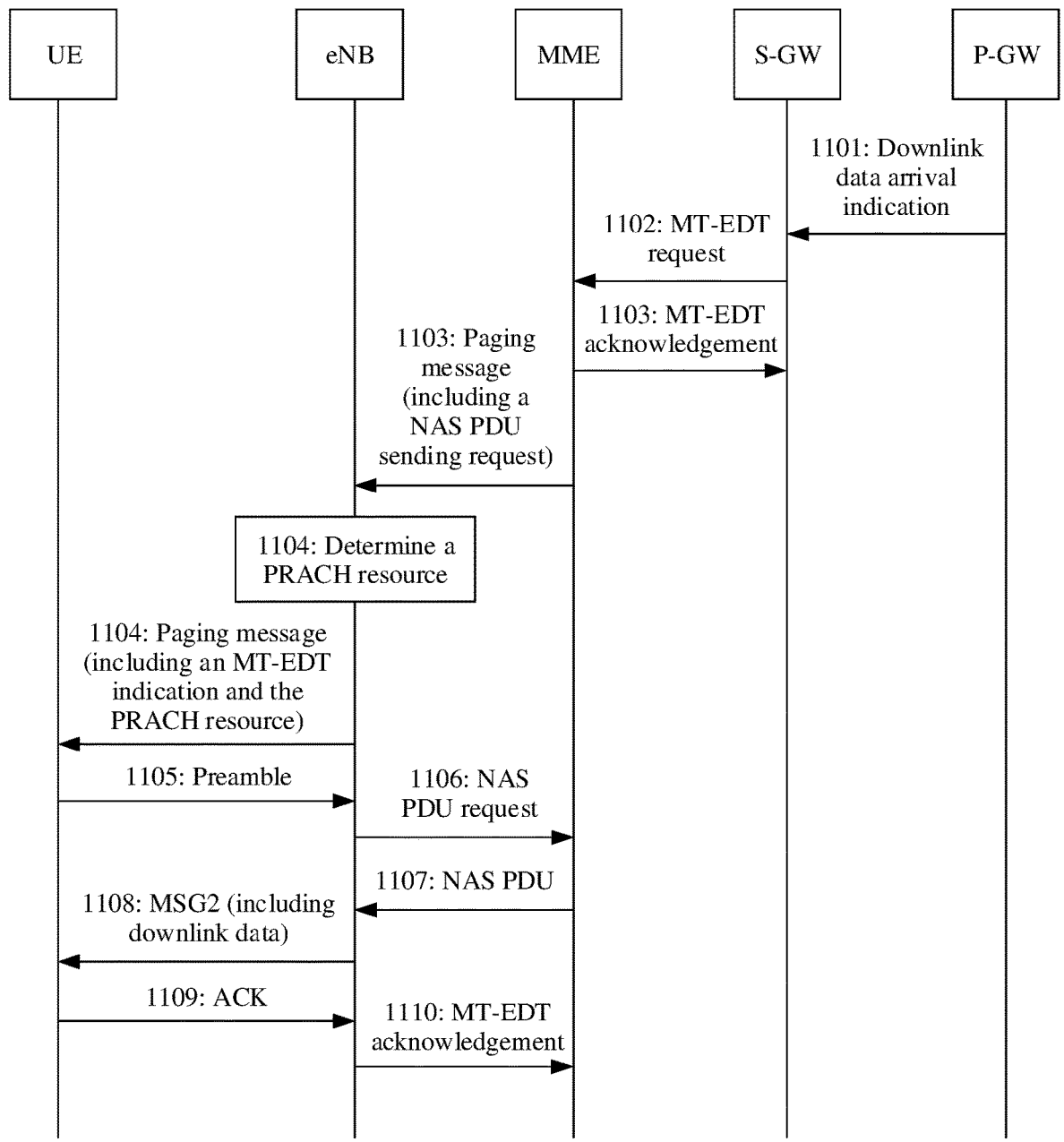
FIG. 11 is a flowchart of an example of triggering early data transmission of downlink data by a core network device.

Refer to FIG. 11. Based on the embodiment shown in FIG. 3, the following describes an example of triggering early data transmission of downlink data by a core network device. It should be understood that the example in FIG. 11 is specifically used in a 4G system architecture, and this embodiment of this application may be further used in another system architecture. This is not limited in this application.

Step 1101: A P-GW network element sends a downlink data arrival indication to an S-GW network element, where the downlink data arrival indication is used to indicate that downlink data (which may also be referred to as terminal data (MT data)) of UE arrives, and transmits the MT data to the S-GW network element.

Step 1102: After receiving the downlink data arrival indication, the S-GW network element sends a downlink early data transmission request (which may be referred to as an MT-EDT request) to an MME network element.

Step 1103: After receiving the MT-EDT request, the MME network element acknowledges the MT-EDT request with the S-GW network element (that is, by using an MT-EDT acknowledgement message), and sends a paging message to one or more eNBs in a registration area of the UE, where the paging message includes a NAS PDU sending request generated by the MME network element through NAS encapsulation.

Step 1104: Each base station that receives the paging message first determines a random access resource for initiating this time of MT-EDT, and then initiates paging to UE in coverage of the base station, where the paging message carries an MT-EDT indication, and a random access configuration (for example, which may include a preamble and/or a PRACH resource).

In FIG. 11, only one eNB is used as an example for description.

Step 1105: After receiving the paging message, the UE first determines whether the paging message includes an MT-EDT indication for the UE (for example, performs the determining by determining whether the MT-EDT includes a UE identity (identity, ID) of the UE), and if the paging message includes the MT-EDT indication, sends, on the PRACH resource carried in the paging message, the preamble carried in the paging message to the eNB.

Step 1106: After receiving the preamble of the UE, the eNB determines that the UE is UE paged by the eNB, and requests, from the MME network element, a NAS PDU that includes downlink data of the UE.

Step 1107: After receiving the request, the MME network element sends, to the eNB, the NAS PDU that includes the downlink data of the UE.

Step 1108: The eNB sends an MSG2 including the downlink data to the UE.

A specific format of the MSG2 is shown in step S303 shown in FIG. 3, and details are not described herein again.

If the eNB fails to obtain the NAS PDU from the MME network element due to an error, the MSG2 does not carry the downlink data, and an RRC connection setup message is carried in a field that is in the MSG2 that should have been used to send the downlink data.

Step 1109: After successfully receiving the downlink data by using the MSG2, the UE sends, by using a TA in the MSG2, an ACK message on a resource indicated by UL-Grant.

If the MSG2 does not carry the downlink data, after receiving the MSG2, the UE establishes an RRC connection based on the RRC connection setup message carried in the MSG. The UE determines, based on the message carried in the MSG2, how to respond to the MSG2.

Step 1110: After receiving the ACK message sent by the UE, the eNB sends an MT-EDT acknowledgement message to the MME network element.

It should be noted that an EDT process shown in FIG. 11 is an example of a scenario in which a core network device triggers early data transmission of downlink data. In this embodiment of this application, a method of including the downlink data in the MSG2 is not limited to this scenario, and is also applicable to another scenario in which EDT is required.

Figure 12:
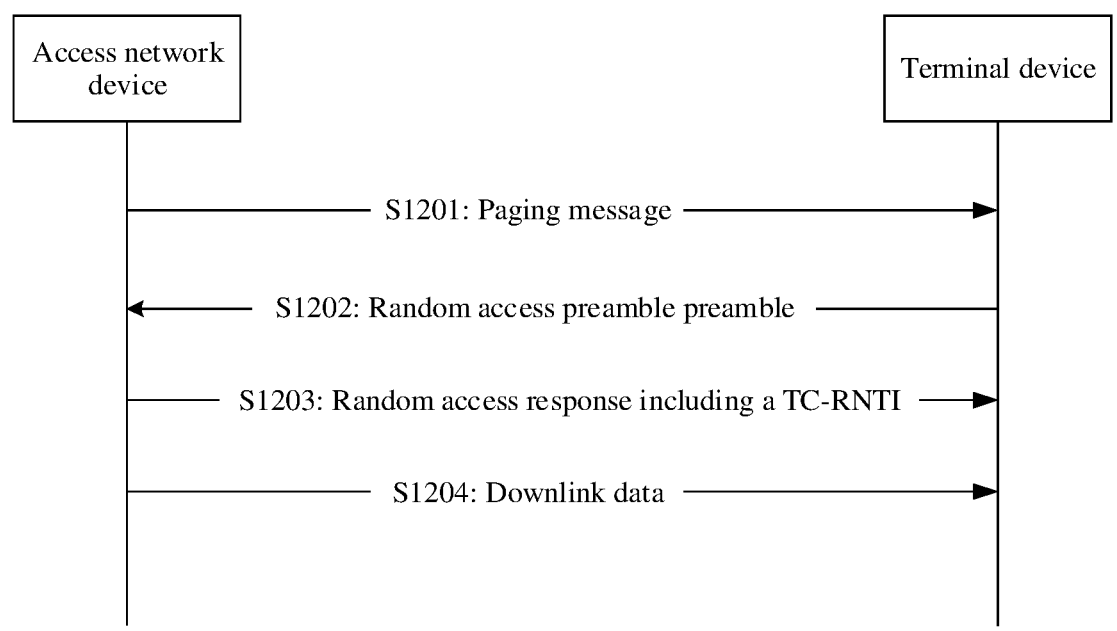
FIG. 12 is a schematic diagram of another example of a data transmission method according to an embodiment of this application.

In the foregoing embodiment, a technical effect of early data transmission is implemented by including the downlink data in the MSG2. Refer to FIG. 12. The following describes another data transmission method according to an embodiment of this application.

Step S1201: An access network device sends a paging message to a terminal device, and the terminal device receives the paging message.

The paging message includes a first indication. Descriptions for the paging message and the first indication are similar to those in step S301, and details are not described herein again.

Step S1202: The terminal device sends, in response to the paging message, a random access preamble to the access network device, and the access network device receives the random access preamble.

The random access preamble corresponds to the first indication.

Step S1201 and step S1202 are similar to step S301 and step S302, and details are not described herein again.

Step S1203: The access network device sends, in response to the random access preamble, a random access response (RAR) to the terminal device, and the terminal device receives the random access response (RAR).

In this embodiment of this application, the RAR includes a temporary cell radio network temporary identity (TC-RNTI). A format of the RAR in this embodiment of this application is the same as a format of an RAR in a current technology. Details are not described herein again.

After receiving the RAR, the terminal device needs to process a TC-RNTI field in the RAR to obtain a value of the TC-RNTI field. In this step, a TA field and a UL-Grant field may not need to be processed. However, in the current technology, when the terminal device performs random access in a contention manner, the TA field, the TC-RNTI field, and the UL-grant field need to be processed. When the terminal device performs random access in a non-contention manner, the TA field and the UL-grant field need to be processed. It can be learned that, compared with a method in the current technology, a processing amount of the terminal device can be reduced, and efficiency of early data transmission can be improved.

Step S1204: The access network device sends downlink data to the terminal device, and the terminal device receives the downlink data.

In this embodiment of this application, a manner in which the access network device sends the downlink data to the terminal device may include but is not limited to the following manner:

The access network device first sends, to the terminal device, a second indication used to indicate a location of a time-frequency resource of the downlink data. For example, the second indication may be sent on a physical downlink control channel (PDCCH). It should be noted that the second indication is an indication scrambled by the access network device by using the TC-RNTI carried in step S1203. Therefore, the terminal device may blindly detect the downlink control channel by using the TC-RNTI carried in step S1203. After detecting the first indication, the terminal device determines, based on the first indication, a time-frequency resource on which the access network device sends the downlink data, and then receives the downlink data on the corresponding time-frequency resource.

Before the access network device sends the downlink data to the terminal device, a manner of obtaining the downlink data is similar to corresponding content in the embodiment shown in FIG. 3, and details are not described herein again.

When the access network device cannot successfully obtain the downlink data, the access network device may also include an RRC connection setup message in the RAR, to trigger the terminal device to establish an RRC connection. A specific manner is similar to corresponding content in the embodiment shown in FIG. 3, and details are not described herein again.

It can be learned from the foregoing technical solution that, the access network device includes the TC-RNTI in the RAR, that is, the TC-RNTI does not need to be carried in the paging message, so that more bits in the paging message are used to indicate a paging capacity. In this way, the paging capacity of the paging message can be increased. In addition, because the RAR is sent after the terminal device sends the preamble, from this perspective, the RAR may be further used to indicate that the access network device successfully receives the preamble sent by the terminal device. In this way, a problem in the current technology that the downlink data fails to be received because the terminal device cannot learn whether the access network device successfully receives the preamble can be avoided.

Figure 13:
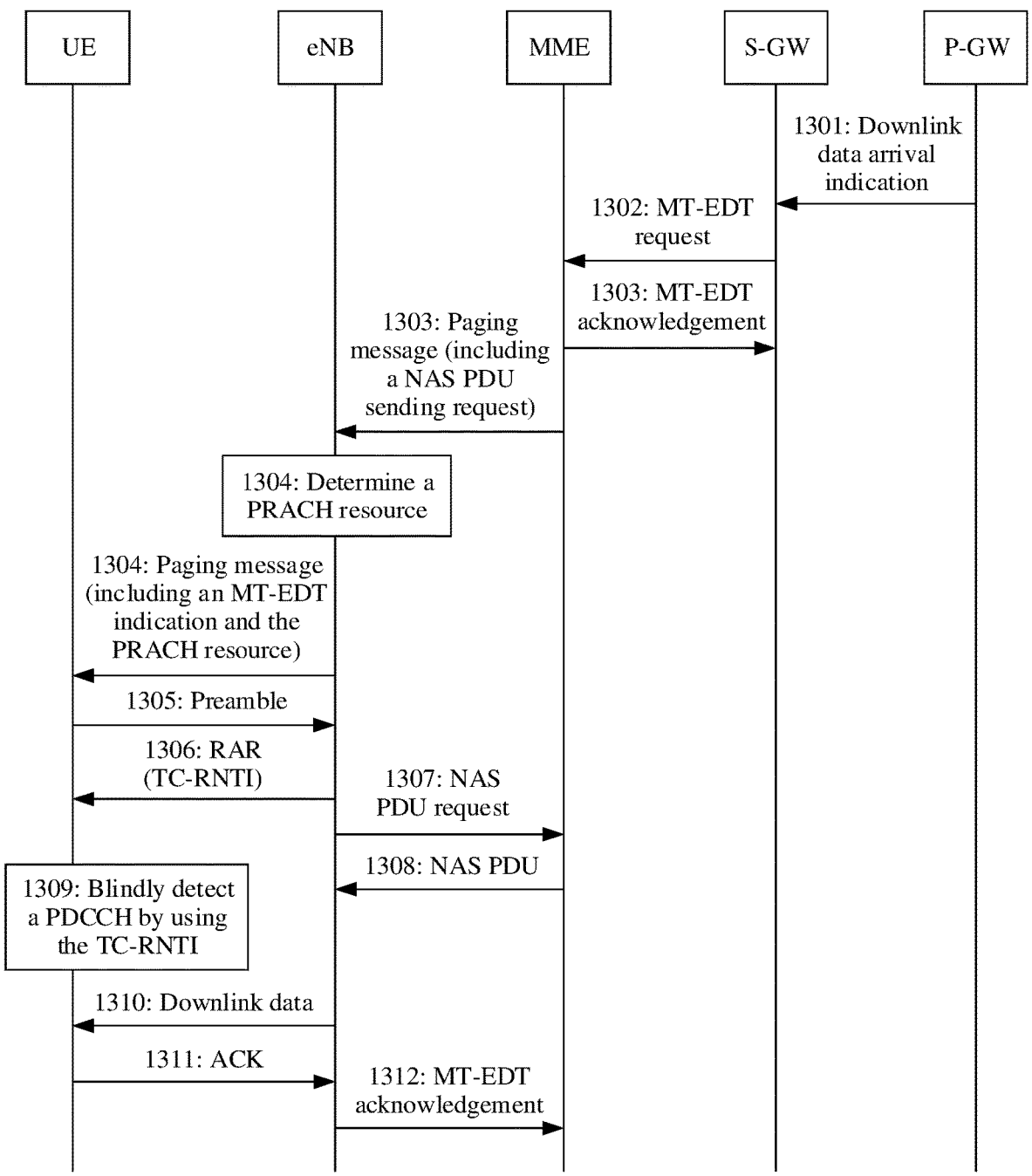
FIG. 13 is a schematic diagram of an example of triggering early data transmission of downlink data by a core network device.

Refer to FIG. 13. Based on the embodiment shown in FIG. 12, the following describes an example of triggering early data transmission of downlink data by a core network device. It should be understood that the example in FIG. 13 is specifically used in a 4G system architecture, and this embodiment of this application may be further used in another system architecture. This is not limited in this application.

Step 1301: A P-GW network element sends a downlink data arrival indication to an S-GW network element, where the downlink data arrival indication is used to indicate that downlink data (which may also be referred to as terminal data (MT data)) of UE arrives, and transmits the MT data to the S-GW network element.

Step 1302: After receiving the downlink data arrival indication, the S-GW network element sends a downlink early data transmission request (which may be referred to as an MT-EDT request) to an MME network element.

Step 1303: After receiving the MT-EDT request, the MME network element acknowledges the MT-EDT request with the S-GW network element, and sends a paging message to one or more eNBs in a registration area of the UE, where the paging message includes a NAS PDU sending request generated by the MME network element through NAS encapsulation.

Step 1304: Each base station that receives the paging message first determines a random access resource for initiating this time of MT-EDT, and then initiates paging to UE in coverage of the base station, where the paging message carries an MT-EDT indication, and a random access configuration (for example, which may include a preamble and/or a PRACH resource).

Step 1305: After receiving the paging message, the UE first determines whether the paging message includes an MT-EDT indication for the UE, and if the paging message includes the MT-EDT indication for the UE, sends, on the PRACH resource carried in the paging message, the preamble carried in the paging message to the eNB.

Step 1306: After receiving the preamble of the UE, the eNB determines that the UE is UE paged by the eNB, and sends an RAR to the UE, where the RAR includes a TA field, a UL-Grant field, and a TC-RNTI field (that is, an RAR in a random access process in a current technology). In this process, the UE needs to process the TC-RNTI field, and does not need to process the TA and UL-Grant fields.

Step 1307: The eNB requests, from the MME network element, a NAS PDU that includes the downlink data of the UE.

In this embodiment of this application, a sequence of performing step 1306 and step 1307 is not limited. Step 1307 and step S13o6 may be simultaneously performed, or step 1307 may be performed first and then step 1306 is performed.

Step 1308: After receiving the request, the MME network element sends, to the eNB, the NAS PDU that includes the downlink data of the UE.

Step 1309: The UE uses the TC-RNTI to blindly detect a PDCCH, to receive the downlink data.

Step 1310: The eNB sends the downlink data of the UE (where the downlink data is the MT data) by using the TC-RNTI.

A specific implementation of step 1310 is similar to that of step S1204, and details are not described herein again.

Step 1311: After receiving the downlink data, the UE determines values of the TA field and the UL-Grant field in the RAR in step 1306, and sends an ACK message on a resource indicated by UL-Grant.

Step 1312: After receiving the ACK message sent by the UE, the eNB sends an MT-EDT acknowledgement message to the MME network element.

If the eNB fails to obtain the NAS PDU from the MME network element due to an error, the eNB does not perform step 1310 and another subsequent step.

It should be noted that an EDT process shown in FIG. 13 is an example of a scenario in which a core network device triggers early data transmission of downlink data. A method in this embodiment of this application is not limited to this scenario, and is also applicable to another scenario in which EDT is required.

Figure 14:
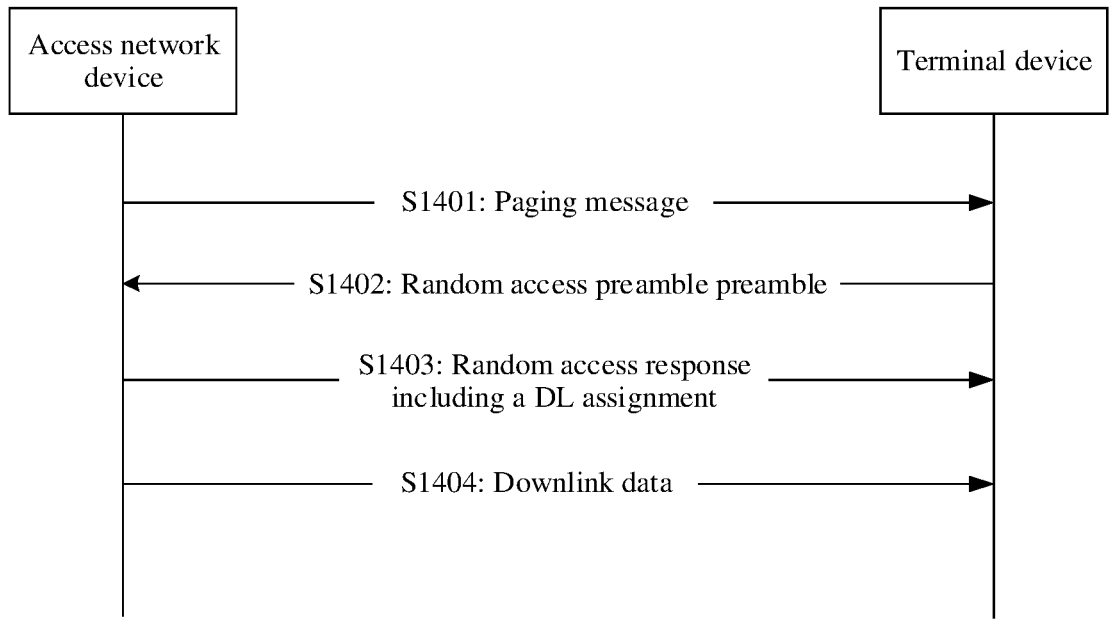
FIG. 14 is a schematic diagram of another example of a data transmission method according to an embodiment of this application.

In the embodiment shown in FIG. 12, a method for performing early data transmission by using a TC-RNTI carried in an RAR is described. Refer to FIG. 14. The following describes another data transmission method according to an embodiment of this application.

Step S1401: An access network device sends a paging message to a terminal device, and the terminal device receives the paging message.

The paging message includes a first indication. Descriptions for the paging message and the first indication are similar to those in step S301, and details are not described herein again.

Step S1402: The terminal device sends, in response to the paging message, a random access preamble to the access network device, and the access network device receives the random access preamble.

The random access preamble corresponds to the first indication.

Step S1401 and step S1402 are similar to step S301 and step S302, and details are not described herein again.

Step S1403: The access network device sends, in response to the random access preamble, a random access response (RAR) to the terminal device, and the terminal device receives the random access response (RAR).

In this embodiment of this application, the RAR includes a downlink assignment DL-assignment. Specifically, the RAR includes a second field used to indicate a UL-grant, where the second field may also be referred to as a UL-grant field. In this case, the access network device may include the DL-assignment in the UL-grant field. In other words, content that should have been indicated by the UL-grant field is a value of the UL-grant. In this embodiment of this application, the content indicated by the UL-grant field is a value of the DL-assignment.

To implement the foregoing function, the access network device may send indication information to the terminal device, to notify the terminal device of a meaning of the content indicated by the UL-grant field. For example, the UL-grant field indicates the value of the DL-assignment. Alternatively, the access network device and the terminal device may agree on a meaning of the content indicated by the UL-grant field. Alternatively, the access network device may include indication information in the RAR, and indicate, by using the indication information, a meaning of the content indicated by the UL-grant field. This is not limited herein.

Because the UL grant field in the RAR is used to indicate the value of the DL assignment, the terminal device may receive the downlink data based on a location indicated by the DL assignment. In this way, duration of blindly detecting a PDCCH by the terminal device can be reduced, and data transmission efficiency can be improved.

In this embodiment of this application, the RAR further includes a TA field, a temporary cell radio network temporary identity (TC-RNTI), and the like. In this process, the terminal device needs to process the TC-RNTI field and the field indicating the value of the DL assignment (which is actually the UL grant field).

Step S1404: The access network device sends the downlink data to the terminal device on a time-frequency resource indicated by the DL-assignment, and the terminal device receives the downlink data on the time-frequency resource indicated by the DL-assignment.

A manner in which the access network device sends the downlink data is similar to that in step S1204, and details are not described herein again.

When the access network device cannot successfully obtain the downlink data, the access network device may also include an RRC connection setup message in the RAR, to trigger the terminal device to establish an RRC connection. A specific manner is similar to corresponding content in the embodiment shown in FIG. 3, and details are not described herein again.

It can be learned from the foregoing technical solution that, the access network device includes the TC-RNTI in the RAR, that is, the TC-RNTI does not need to be carried in the paging message, so that more bits in the paging message are used to indicate a paging capacity. In this way, the paging capacity of the paging message can be increased. In addition, because the RAR is sent after the terminal device sends the preamble, from this perspective, the RAR may be further used to indicate that the access network device successfully receives the preamble sent by the terminal device. In this way, a problem in the current technology that the downlink data fails to be received because the terminal device cannot learn whether the access network device successfully receives the preamble can be avoided.

In the foregoing embodiments provided in this application, the methods provided in the embodiments of this application are separately described from perspectives of an access network device, a terminal device, and interaction between the two. To implement the functions in the methods provided in the embodiments of this application, the access network device and the terminal device may each include a hardware structure and/or a software module, and implement the functions in a form of the hardware structure, the software module, or a combination of the hardware structure and the software module. Whether a function in the foregoing functions is performed by the hardware structure, the software module, or the combination of the hardware structure and the software module depends on particular applications and design constraints of the technical solutions.

Figure 15:
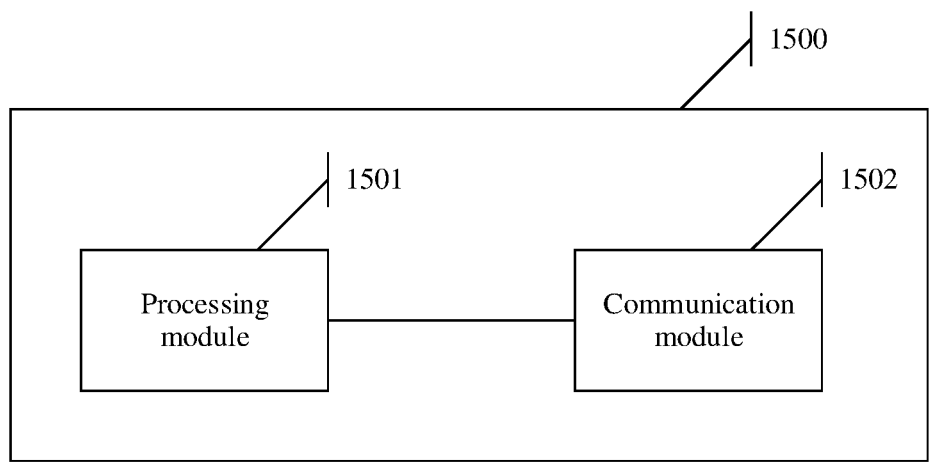
FIG. 15 is a schematic structural diagram of a data transmission apparatus according to an embodiment of this application.

FIG. 15 is a schematic structural diagram of a data transmission apparatus 1500. The data transmission apparatus 1500 may be an access network device, and can implement a function of the access network device in the methods provided in the embodiments of this application. The data transmission apparatus 1500 may alternatively be an apparatus that can support the access network device in implementing a function of the access network device in the methods provided in the embodiments of this application. The data transmission apparatus 1500 may be a hardware structure, a software module, or a combination of a hardware structure and a software module. The data transmission apparatus 1500 may be implemented by a chip system. In the embodiments of this application, the chip system may include a chip, or may include a chip and another discrete component.

The data transmission apparatus 1500 may include a processing module 1501 and a communication module 1502.

The processing module 1501 may be configured to generate information sent by the communication module 1502 in FIG. 3 or FIG. 11 to FIG. 14, or configured to perform step S1104 in the embodiment shown in FIG. 11, or configured to perform step S1304 in the embodiment shown in FIG. 13, and/or configured to support another process of the technology described in this specification.

The communication module 1502 is used by the data transmission apparatus 1500 to communicate with another module, and may be a circuit, a component, an interface, a bus, a software module, a transceiver, or any other apparatus that can implement communication.

The communication module 1502 may be configured to perform step S301 to step S303 in the embodiment shown in FIG. 3, or may be configured to perform step S1103 to step S1110 in the embodiment shown in FIG. 11, or may be configured to perform step S1201 to step S1204 in the embodiment shown in FIG. 12, or may be configured to perform step S1303 to step S1308 and step S1310 to step S1312 in the embodiment shown in FIG. 13, or configured to perform step S1401 to step S1404 in the embodiment shown in FIG. 14, and/or configured to support another process of the technology described in this specification.

All related content of the steps in the foregoing method embodiments may be cited in function descriptions of corresponding functional modules. Details are not described herein again.

Figure 16:
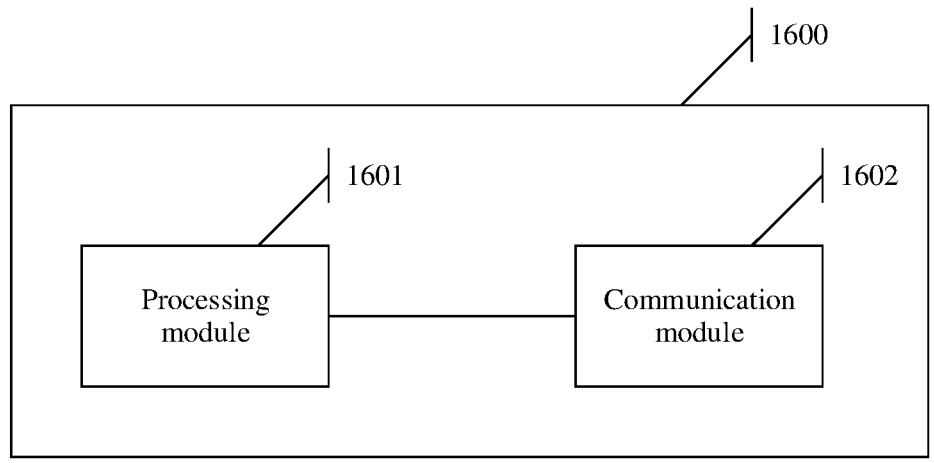
FIG. 16 is a schematic structural diagram of another data transmission apparatus according to an embodiment of this application.

FIG. 16 is a schematic structural diagram of a data transmission apparatus 1600. The data transmission apparatus 1600 may be a terminal device, and can implement a function of the terminal device in the methods provided in the embodiments of this application. The data transmission apparatus 1600 may alternatively be an apparatus that can support the terminal device in implementing a function of the terminal device in the methods provided in the embodiments of this application. The data transmission apparatus 1600 may be a hardware structure, a software module, or a combination of a hardware structure and a software module. The data transmission apparatus 1600 may be implemented by a chip system. In the embodiments of this application, the chip system may include a chip, or may include a chip and another discrete component.

The data transmission apparatus 1600 may include a processing module 1601 and a communication module 1602.

The processing module 1601 may be configured to generate information sent by the communication module 1602 in FIG. 3 or FIG. 11 to FIG. 14, or configured to perform step S1309 in the embodiment shown in FIG. 13, and/or configured to support another process of the technology described in this specification.

The communication module 1602 may be configured to perform step S301 to step S303 in the embodiment shown in FIG. 3, or may be configured to perform step S1104, step S1105, step S1108, and step S1109 in the embodiment shown in FIG. 11, or may be configured to perform step S1201 to step S1204 in the embodiment shown in FIG. 12, or may be configured to perform step S1304 to step S1306, step S1310, and step S1311 in the embodiment shown in FIG. 13, or configured to perform step S1401 to step S1404 in the embodiment shown in FIG. 14, and/or configured to support another process of the technology described in this specification. The communication module 1602 is used by the data transmission apparatus 1600 to communicate with another module, and may be a circuit, a component, an interface, a bus, a software module, a transceiver, or any other apparatus that can implement communication.

All related content of the steps in the foregoing method embodiments may be cited in function descriptions of corresponding functional modules. Details are not described herein again.

Division into modules in the embodiments of this application is an example, is only logical function division, and may be other division during actual implementation. In addition, functional modules in the embodiments of this application may be integrated into one processor, or may exist alone physically, or two or more modules may be integrated into one module. The integrated module may be implemented in a form of hardware, or may be implemented in a form of a software function module.

Figure 17:
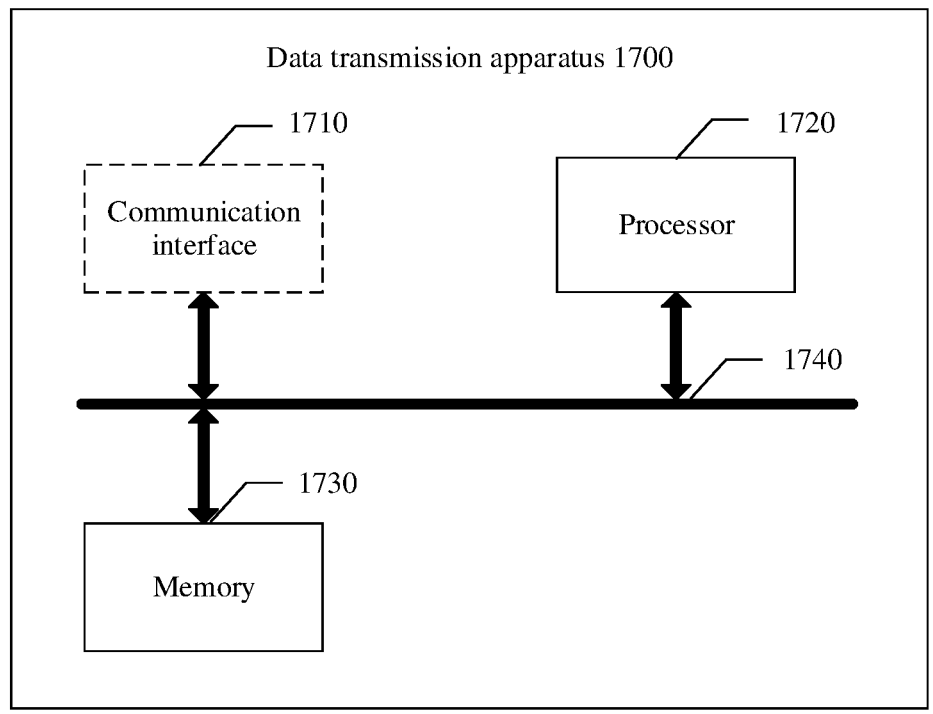
FIG. 17 is a schematic structural diagram of another data transmission apparatus according to an embodiment of this application.

FIG. 17 shows a data transmission apparatus 1700 according to an embodiment of this application. The data transmission apparatus 1700 may be the terminal device in the embodiment shown in any one of FIG. 3 or FIG. 11 to FIG. 14, and can implement a function of the terminal device in the methods provided in the embodiments of this application. The data transmission apparatus 1700 may alternatively be an apparatus that can support the terminal device in implementing a function of the terminal device in the methods provided in the embodiments of this application. The data transmission apparatus 1700 may be a chip system. In the embodiments of this application, the chip system may include a chip, or may include a chip and another discrete component.

In hardware implementation, the communication module 1602 may be a transceiver, and the transceiver is integrated into the data transmission apparatus 1700 to form a communication interface 1710.

The data transmission apparatus 1700 includes at least one processor 1720, configured to implement or support the data transmission apparatus 1700 in implementing a function of the access network device in the methods provided in the embodiments of this application. For example, the processor 1720 may use a TC-RNTI to blindly detect a PDCCH. For details, refer to detailed descriptions in the method examples. Details are not described herein again.

The data transmission apparatus 1700 may further include at least one memory 1730, configured to store program instructions and/or data. The memory 1730 is coupled to the processor 1720. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1720 may cooperate with the memory 1730. The processor 1720 may execute the program instructions stored in the memory 1730. At least one of the at least one memory may be included in the processor.

The data transmission apparatus 1700 may further include a communication interface 1710, configured to communicate with another device through a transmission medium, so that an apparatus used in the data transmission apparatus 1700 can communicate with the another device. For example, the another device may be an access network device. The processor 1720 may send and receive data through the communication interface 1710. The communication interface 1710 may be specifically a transceiver.

A specific connection medium between the communication interface 1710, the processor 1720, and the memory 1730 is not limited in this embodiment of this application. In this embodiment of this application, the memory 1730, the processor 1720, and the communication interface 1710 are connected through a bus 1740 in FIG. 17, and the bus is represented by a thick line in FIG. 17. A connection manner between other components is merely schematically described, and is not limited thereto. The bus may be classified into an address bus, a data bus, a control bus, and the like. For ease of representation, only one thick line is used to represent the bus in FIG. 17, but this does not mean that there is only one bus or only one type of bus.

In this embodiment of this application, the processor 1720 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by a combination of hardware and software modules in the processor.

In this embodiment of this application, the memory 1730 may be a non-volatile memory, such as a hard disk drive (hard disk drive, HDD) or a solid-state drive (solid-state drive, SSD), or may be a volatile memory (volatile memory), such as a random access memory (random-access memory, RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store the program instructions and/or the data.

Figure 18:
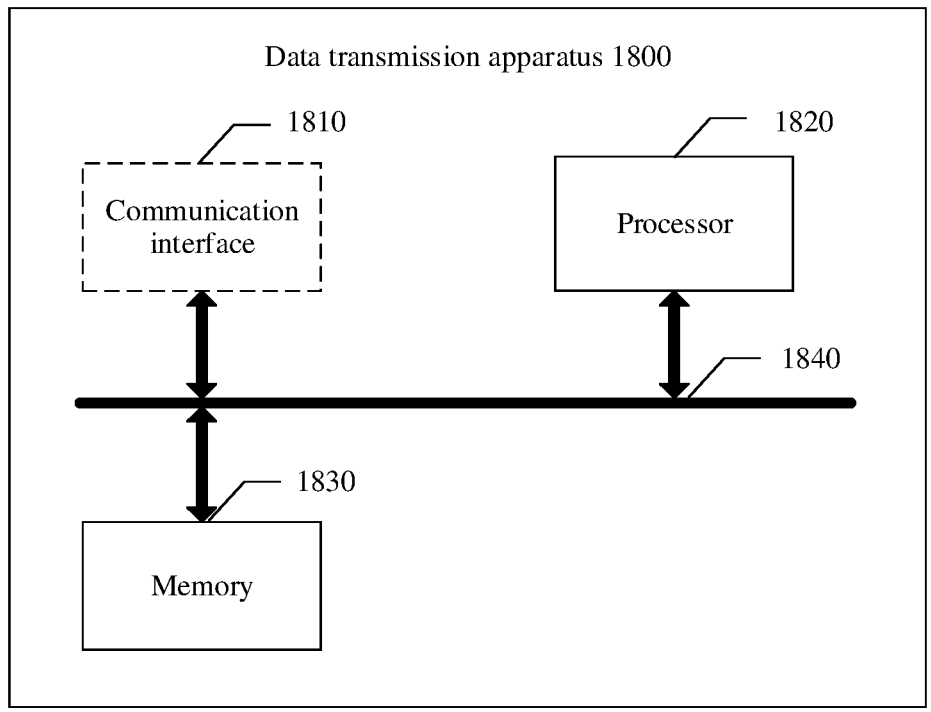
FIG. 18 is a schematic structural diagram of another data transmission apparatus according to an embodiment of this application.

FIG. 18 shows a data transmission apparatus 1800 according to an embodiment of this application. The data transmission apparatus 1800 may be an access network device, and can implement a function of the access network device in the methods provided in the embodiments of this application. The data transmission apparatus 1800 may alternatively be an apparatus that can support the access network device in implementing a function of the access network device in the methods provided in the embodiments of this application. The data transmission apparatus 1800 may be a chip system. In the embodiments of this application, the chip system may include a chip, or may include a chip and another discrete component.

In hardware implementation, the communication module 1502 may be a transceiver, and the transceiver is integrated into the data transmission apparatus 1800 to form a communication interface 1810.

The data transmission apparatus 1800 includes at least one processor 1820, configured to implement or support the data transmission apparatus 1800 in implementing a function of the access network device in the methods provided in the embodiments of this application. For example, the processor 1820 may determine a PRACH resource. For details, refer to detailed descriptions in the method examples. Details are not described herein again.

The data transmission apparatus 1800 may further include at least one memory 1830, configured to store program instructions and/or data. The memory 1830 is coupled to the processor 1820. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1820 may cooperate with the memory 1830. The processor 1820 may execute the program instructions stored in the memory 1830. At least one of the at least one memory may be included in the processor.

The data transmission apparatus 1800 may further include a communication interface 1810, configured to communicate with another device through a transmission medium, so that an apparatus used in the apparatus 1800 can communicate with the another device. For example, the another device may be a terminal. The processor 1820 may send and receive data through the communication interface 1810. The communication interface 1810 may be specifically a transceiver.

A specific connection medium between the communication interface 1810, the processor 1820, and the memory 1830 is not limited in this embodiment of this application. In this embodiment of this application, the memory 1830, the processor 1820, and the communication interface 1810 are connected through a bus 1840 in FIG. 18, and the bus is represented by a thick line in FIG. 18. A connection manner between other components is merely schematically described, and is not limited thereto. The bus may be classified into an address bus, a data bus, a control bus, and the like. For ease of representation, only one thick line is used to represent the bus in FIG. 18, but this does not mean that there is only one bus or only one type of bus.

In this embodiment of this application, the processor 1820 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by a combination of hardware and software modules in the processor.

In this embodiment of this application, the memory 1830 may be a non-volatile memory, such as a hard disk drive (hard disk drive, HDD) or a solid-state drive (solid-state drive, SSD), or may be a volatile memory (volatile memory), such as a random access memory (random-access memory, RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store the program instructions and/or the data.

An embodiment of this application further provides a data transmission apparatus. The data transmission apparatus may be a terminal or a circuit. The data transmission apparatus may be configured to perform an action performed by the terminal device in the foregoing method embodiments.

Figure 19:
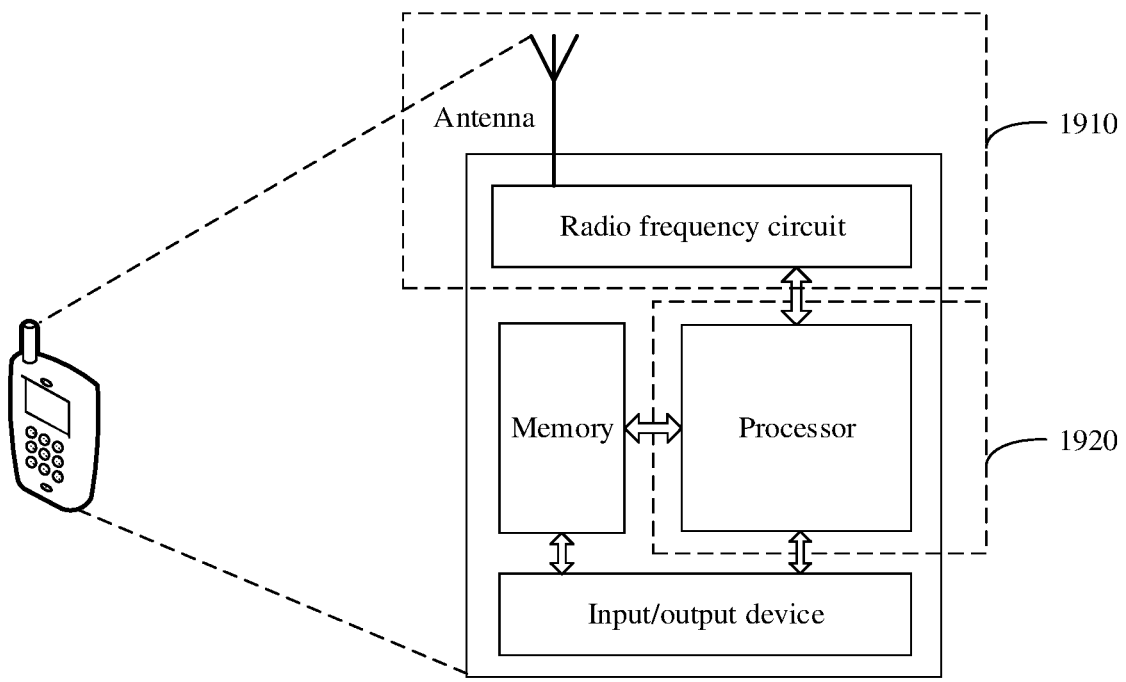
FIG. 19 is a schematic block diagram of a data transmission apparatus according to an embodiment of this application.

When the data transmission apparatus is a terminal device, FIG. 19 is a simplified schematic structural diagram of the terminal device. For ease of understanding and illustration, an example in which the terminal device is a mobile phone is used in FIG. 19. As shown in FIG. 19, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and the data. The radio frequency circuit is mainly configured to: perform conversion between a baseband signal and a radio frequency signal, and process the radio frequency signal. The antenna is mainly configured to send/receive a radio frequency signal in a form of an electromagnetic wave. The input/output apparatus, such as a touchscreen, a display screen, or a keyboard, is mainly configured to: receive data entered by a user, and output data to the user. It should be noted that terminal devices of some types may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to outside in a form of an electromagnetic wave by using the antenna. When data is sent to the terminal device, the radio frequency circuit receives the radio frequency signal by using the antenna, converts the radio frequency signal into a baseband signal, and outputs the baseband signal to the processor, and the processor converts the baseband signal into data and processes the data. For ease of description, only one memory and one processor are shown in FIG. 19. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 19, the terminal device includes a transceiver unit 1910 and a processing unit 1920. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1910 and that is configured to implement a receiving function may be considered as a receiving unit, and a component that is in the transceiver unit 1910 and that is configured to implement a sending function may be considered as a sending unit. In other words, the transceiver unit 1910 includes the receiving unit and the sending unit. The transceiver unit sometimes may also be referred to as a transceiver machine, a transceiver, a transceiver circuit, or the like. The receiving unit may also be sometimes referred to as a receiver machine, a receiver, a receiving circuit, or the like. The sending unit may also be sometimes referred to as a transmitter machine, a transmitter, a transmitting circuit, or the like.

It should be understood that the transceiver unit 1910 is configured to perform a sending operation and a receiving operation on a terminal device side in the foregoing method embodiments, and the processing unit 1920 is configured to perform an operation other than the receiving operation and the sending operation of the terminal device in the foregoing method embodiments.

For example, in an implementation, the transceiver unit 1910 is configured to perform step S301 to step S303 in the embodiment shown in FIG. 3, or is configured to perform step S1104, step S1105, step S1108, and step S1109 in the embodiment shown in FIG. 11, or is configured to perform step S1201 to step S1204 in the embodiment shown in FIG. 12, or is configured to perform step S1304 to step S1306, step S1310, and step S1311 in the embodiment shown in FIG. 13, or is configured to perform receiving and sending operations on the terminal device side in step S1401 to step S1404 in the embodiment shown in FIG. 14, and/or the transceiver unit 1910 is further configured to perform other receiving and sending steps on the terminal device side in the embodiments of this application. The processing unit 1920 is configured to generate information sent by the communication module 1602 in FIG. 3 or FIG. 11 to FIG. 14, or configured to perform step S1309 in the embodiment shown in FIG. 13, and/or the processing unit 1920 is further configured to perform another processing step on the terminal device side in the embodiments of this application.

When the data transmission apparatus is a chip, the chip includes a transceiver unit and a processing unit. The transceiver unit may be an input/output circuit or a communication interface. The processing unit may be a processor, a microprocessor, or an integrated circuit, integrated on the chip.

Figure 20:
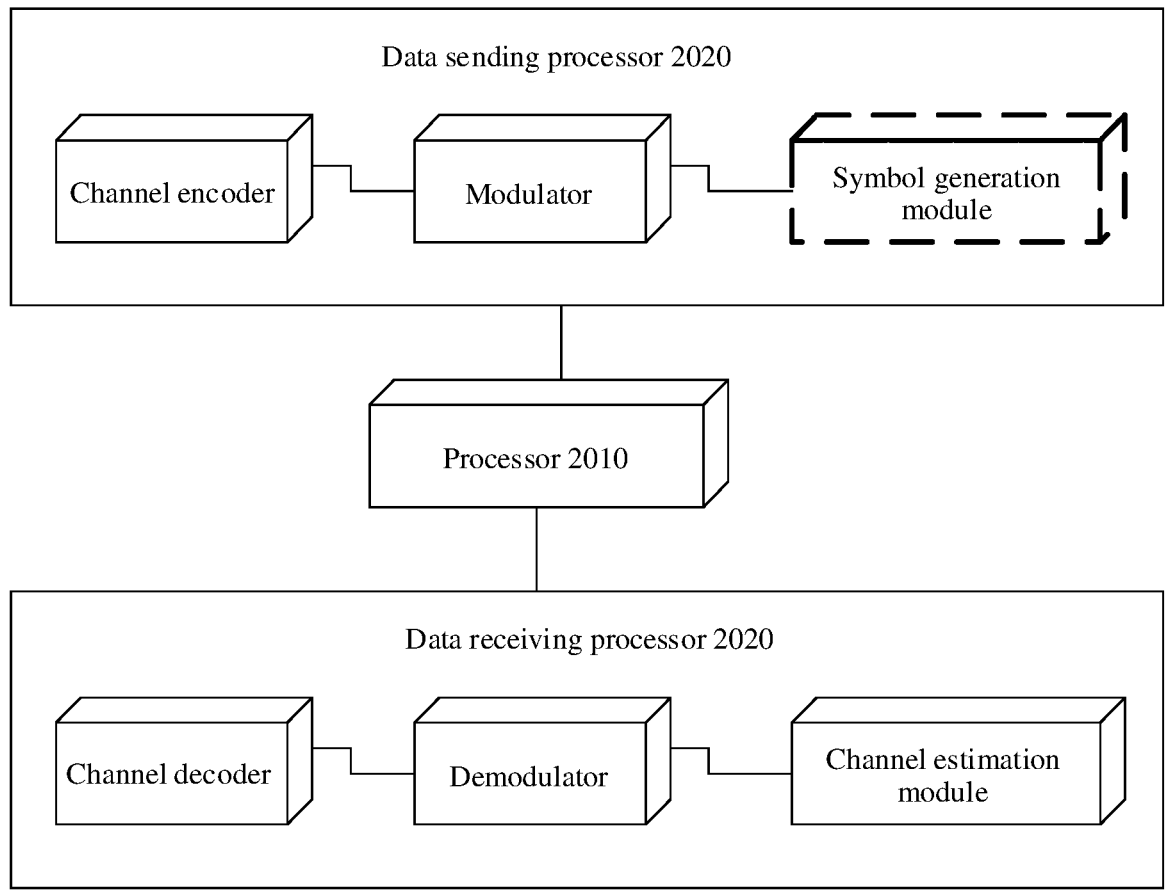
FIG. 20 is another schematic block diagram of a data transmission apparatus according to an embodiment of this application.

When the data transmission apparatus in this embodiment is a terminal device, refer to a device shown in FIG. 20. In an example, the device can implement a function similar to a function of the processor 1720 in FIG. 17. In FIG. 20, the device includes a processor 2010, a data sending processor 2020, and a data receiving processor 2030. The processing module 1601 in the foregoing embodiment may be the processor 2010 in FIG. 20, and implements a corresponding function. The transceiver module 1602 in the foregoing embodiment may be the data sending processor 2020 and/or the data receiving processor 2030 in FIG. 20. Although FIG. 20 shows a channel encoder and a channel decoder, it may be understood that these modules do not constitute a limitation on this embodiment and are merely examples.

Figure 21:
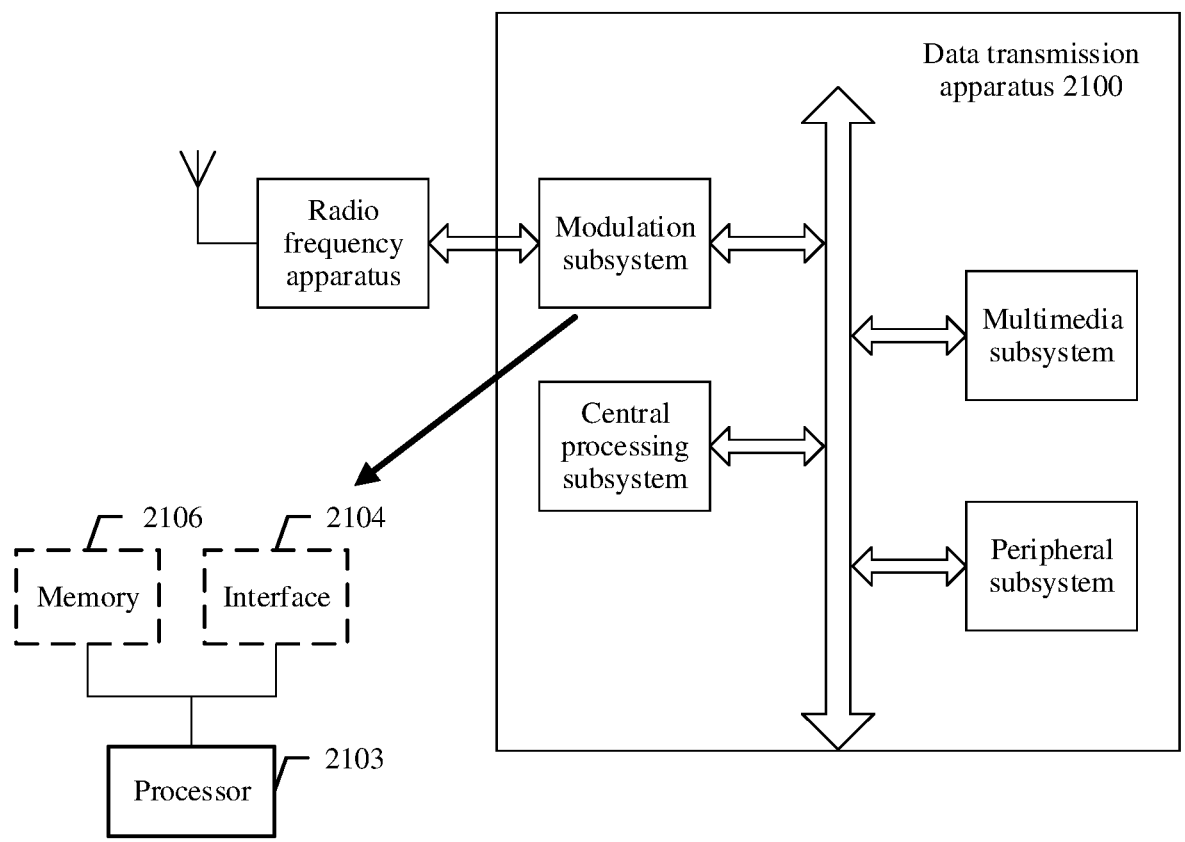
FIG. 21 is still another schematic block diagram of a data transmission apparatus according to an embodiment of this application.

FIG. 21 shows another form of this embodiment. A data transmission apparatus 2100 includes modules such as a modulation subsystem, a central processing subsystem, and a peripheral subsystem. The data transmission apparatus in this embodiment may be used as the modulation subsystem in the data transmission apparatus. Specifically, the modulation subsystem may include a processor 2103 and an interface 2104. The processor 2103 implements the functions of the processing module 801, and the interface 2104 implements the functions of the communication module 802. In another variation, the modulation subsystem includes a memory 2106, the processor 2103, and a program that is stored in the memory 2106 and that can be run on the processor. When executing the program, the processor 2103 implements a method on the terminal device side in the foregoing method embodiments. It should be noted that the memory 2106 may be non-volatile or volatile. The memory 2106 may be located in the modulation subsystem, or may be located in a processing apparatus 2100, provided that the memory 2106 can be connected to the processor 2103.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product that includes instructions is provided. When the instructions are executed, the method on the terminal device side in the foregoing method embodiments is performed.

Figure 22:
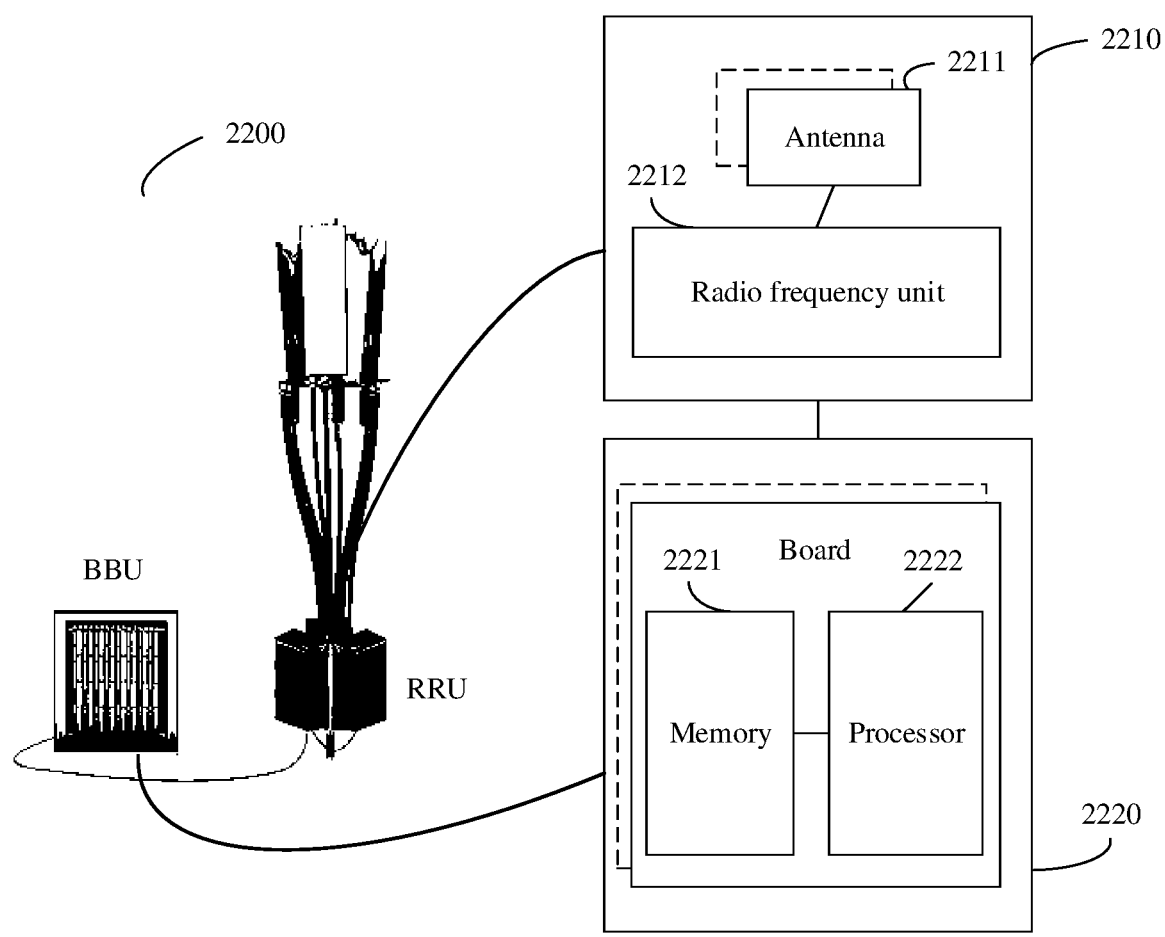
FIG. 22 is still another schematic block diagram of a data transmission apparatus according to an embodiment of this application.

When the apparatus in this embodiment is an access network device, the access network device may be shown in FIG. 22. An apparatus 2200 includes one or more radio frequency units, such as a remote radio unit (remote radio unit, RRU) 2210 and one or more baseband units (baseband unit, BBU) (which may also be referred to as digital units, digital units, DUs) 2220. The RRU 2210 may be referred to as a communication module, and corresponds to the communication module 1502 in FIG. 15. Optionally, the communication module may also be referred to as a transceiver machine, a transceiver circuit, a transceiver, or the like, and may include at least one antenna 2211 and a radio frequency unit 2212. The RRU 2210 part is mainly configured to: receive and send a radio frequency signal, and perform conversion between the radio frequency signal and a baseband signal, for example, is configured to send indication information to the terminal device. The BBU 2210 part is mainly configured to: perform baseband processing, control the base station, and the like. The RRU 2210 and the BBU 2220 may be physically disposed together, or may be physically separated, that is, in a distributed base station.

The BBU 2220 is a control center of the base station, and may also be referred to as a processing module. The BBU 2220 may correspond to the processing module 1501 in FIG. 15, and is mainly configured to implement a baseband processing function such as channel coding, multiplexing, modulation, or spreading. For example, the BBU (the processing module) may be configured to control the base station to perform an operation procedure related to a network device in the foregoing method embodiments, for example, generate the foregoing indication information.

In an example, the BBU 2220 may include one or more boards, and a plurality of boards may jointly support a radio access network (for example, an LTE network) having a single access standard, or may separately support radio access networks (for example, an LTE network, a 5G network, or another network) having different access standards. The BBU 2220 further includes a memory 2221 and a processor 2222. The memory 2221 is configured to store necessary instructions and data. The processor 2222 is configured to control the base station to perform a necessary action, for example, is configured to control the base station to perform the operation procedure related to the network device in the foregoing method embodiments. The memory 2221 and the processor 2222 may serve the one or more boards. To be specific, a memory and a processor may be separately disposed on each board. Alternatively, a plurality of boards may share a same memory and a same processor. In addition, each board may be further provided with a necessary circuit.

An embodiment of this application further provides a computer-readable storage medium, including instructions. When the instructions are run on a computer, the computer is enabled to perform the method performed by the terminal device in the embodiment in any one of FIG. 3 or FIG. 11 to FIG. 14.

An embodiment of this application further provides a computer-readable storage medium, including instructions. When the instructions are run on a computer, the computer is enabled to perform the method performed by the access network device in the embodiment in any one of FIG. 3 or FIG. 11 to FIG. 14.

An embodiment of this application further provides a computer program product, including instructions. When the instructions are run on a computer, the computer is enabled to perform the method performed by the terminal device in the embodiment in any one of FIG. 3 or FIG. 11 to FIG. 14.

An embodiment of this application further provides a computer program product, including instructions. When the instructions are run on a computer, the computer is enabled to perform the method performed by the access network device in the embodiment in any one of FIG. 3 or FIG. 11 to FIG. 14.

An embodiment of this application provides a chip system. The chip system includes a processor, may further include a memory, and is configured to implement a function of the terminal device in the foregoing methods. The chip system may include a chip, or may include a chip and another discrete component.

An embodiment of this application provides a chip system. The chip system includes a processor, may further include a memory, and is configured to implement a function of the access network device in the foregoing methods. The chip system may include a chip, or may include a chip and another discrete component.

An embodiment of this application provides a system. The system includes the foregoing access network device or terminal device.

A method provided in the embodiments of this application may be completely or partially implemented by using software, hardware, firmware, or any combination thereof. When being implemented by using the software, the method may be completely or partially implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clear that a person skilled in the art can make various modifications and variations to this application without departing from the scope of this application. In this way, this application is intended to cover these modifications and variations of this application provided that they fall within the scope of the claims of this application and equivalent technologies thereof.

What is claimed is:

1. A data transmission method, comprising:
   sending, by an access network device, a paging message to a terminal device, wherein the paging message comprises a first indication and an early data transmission (EDT) indication;
   receiving, by the access network device, a random access preamble from the terminal device, wherein the random access preamble corresponds to the first indication;
   sending, by the access network device in response to the random access preamble, a response message to the terminal device, wherein the response message comprises downlink data and one or more of a timing advance (TA), an uplink grant (UL-Grant), a temporary cell radio network temporary identity (TC-RNTI), a logical channel identifier (LCID), or a downlink assignment (DL-assignment); and
   receiving, by the access network device, a radio resource control (RRC) early data transmission request sent by the terminal device after the access network device sends the response message.

2. The method according to claim 1, wherein the response message is a random access response (RAR), the RAR comprises a first field, and the first field is used to indicate that the RAR carries the downlink data.

3. The method according to claim 1, wherein the response message further indicates that the access network device successfully receives the random access preamble.

4. The method according to claim 1, wherein the response message is a random access response (RAR), and wherein the RAR comprises the TC-RNTI; and
wherein the method further comprises sending, by the access network device, second downlink data to the terminal device.

5. The method according to claim 4, wherein the method further comprises performing, before the sending the downlink data to the terminal device:
sending, by the access network device, a second indication, wherein the second indication indicates a location of a time-frequency resource of the second downlink data; and
scrambling, by the access network device, the second indication by using the TC-RNTI.

6. The method of claim 1, wherein the response message is a random access response (RAR), wherein the RAR comprises a DL-assignment in a field used to indicate the UL-Grant; and
sending, by the access network device, downlink data to the terminal device on a time-frequency resource indicated by the DL-assignment.

7. The method according to claim 6, wherein the RAR comprises a second field, the second field is used to indicate the UL-grant, and the DL-assignment is indicated by using the second field.

8. The method according to claim 6, wherein the RAR further comprises the TC-RNTI.

9. The method according to claim 1, further comprising:
sending, by the access network device, a data request message to a core network device, wherein the data request message requests the downlink data; and
receiving, by the access network device, a data request response message from the core network device, wherein the data request response message comprises the downlink data.

10. A data transmission method, comprising:
receiving, by a terminal device, a paging message from an access network device, wherein the paging message comprises a first indication and an early data transmission (EDT) indication;
sending, by the terminal device in response to the paging message, a random access preamble to the access network device, wherein the random access preamble corresponds to the first indication; and
receiving, by the terminal device, a response message from the access network device, wherein the response message comprises downlink data and one or more of a timing advance (TA), an uplink grant (UL-Grant), a temporary cell radio network temporary identity (TC-RNTI), a logical channel identifier (LCID), or a downlink assignment (DL-assignment); and
sending, by the terminal device, to the access network device, a radio resource control (RRC) early data transmission request after receiving the response message.

11. The method according to claim 10, wherein the response message is a random access response (RAR), the RAR comprises a first field, and wherein the first field indicates that the RAR carries the downlink data.

12. The method according to claim 10, wherein the response message further indicates that the access network device successfully receives the random access preamble.

13. The method of claim 10, wherein the response message is a random access response (RAR), and wherein the RAR comprises the TC-RNTI; and
receiving, by the terminal device, second downlink data.

14. The method according to claim 13, further comprising performing, before the receiving the downlink data:
monitoring, by the terminal device, a downlink control channel by using the TC-RNTI, to obtain a second indication, wherein the second indication indicates a location of a time-frequency resource of the second downlink data.

15. The method according to claim 14, wherein the receiving, by the terminal device, second downlink data comprises:
receiving, by the terminal device, the second downlink data on the time-frequency resource indicated by the second indication.

16. The method of claim 10, wherein the response message is a random access response (RAR), and wherein the RAR comprises a DL-assignment in a field used to indicate the UL-Grant; and
receiving, by the terminal device, downlink data on a time-frequency resource indicated by the DL-assignment.

17. The method according to claim 16, wherein the RAR comprises a second field, the second field is used to indicate the UL-grant, and wherein the DL-assignment is indicated by using the second field.

18. The method according to claim 16, wherein the RAR further comprises the TC-RNTI.

19. A communication apparatus, comprising:
a processor; and
a non-transitory computer readable memory coupled to the processor and storing a program for execution by the processor, the program including instructions for:
receiving, by the communication apparatus, a paging message from an access network device, wherein the paging message comprises a first indication and an early data transmission (EDT) indication;
sending, by the communication apparatus in response to the paging message, a random access preamble to the access network device, wherein the random access preamble corresponds to the first indication; and
receiving, by the communication apparatus, a response message from the access network device, wherein the response message comprises downlink data and one or more of a timing advance (TA), an uplink grant (UL-Grant), a temporary cell radio network temporary identity (TC-RNTI), a logical channel identifier (LCID), or a downlink assignment (DL-assignment); and
sending, by the communication apparatus, to the access network device, a radio resource control (RRC) early data transmission request after receiving the response message.

20. The apparatus of claim 19, wherein the response message is a random access response (RAR), and wherein the RAR comprises the TC-RNTI; and
wherein the program further includes instructions for:
obtaining a second indication by monitoring a downlink control channel by using the TC-RNTI, wherein the second indication indicates a location of a time-frequency resource of the downlink data; and receiving, after obtaining the second indication, downlink data on the time-frequency resource indicated by the second indication.

* * * * *